United States Patent
Satou et al.

(10) Patent No.: US 10,222,949 B2
(45) Date of Patent: Mar. 5, 2019

(54) SCENARIO GENERATION METHOD IN WHICH VARIOUS DATA ARE ASSOCIATED WITH EACH OTHER, SCENARIO EXECUTION METHOD IN WHICH VARIOUS DATA ARE ASSOCIATED WITH EACH OTHER, SCENARIO GENERATION DEVICE, AND SCENARIO EXECUTION DEVICE

(71) Applicant: FUJITSU LIMITED, Kawasaki-shi, Kanagawa (JP)

(72) Inventors: Shingo Satou, Kawasaki (JP);
Toshihiro Morimoto, Atsugi (JP);
Yukitoshi Ishihara, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 264 days.

(21) Appl. No.: 14/456,048

(22) Filed: Aug. 11, 2014

(65) Prior Publication Data
US 2015/0067498 A1 Mar. 5, 2015

(30) Foreign Application Priority Data
Aug. 29, 2013 (JP) .................. 2013-178417

(51) Int. Cl.
*G06F 3/0484* (2013.01)
*G06F 11/36* (2006.01)

(52) U.S. Cl.
CPC ........ *G06F 3/0484* (2013.01); *G06F 11/3672* (2013.01)

(58) Field of Classification Search
CPC ...... G06F 3/048; G06F 3/0484; G06F 3/0481; G06F 3/04812; G06F 11/3672
(Continued)

(56) References Cited

U.S. PATENT DOCUMENTS

| | | | | |
|---|---|---|---|---|
| 7,712,074 B2 * | 5/2010 | Ren | ............. | G06F 9/4443 715/700 |
| 2005/0132333 A1 * | 6/2005 | Neumann | ............. | G06F 11/3672 717/124 |
| 2009/0089320 A1 * | 4/2009 | Tendler | ............. | G06F 11/36 |
| 2009/0271386 A1 * | 10/2009 | Milov | ............. | G06F 11/3692 |

(Continued)

FOREIGN PATENT DOCUMENTS

| | | |
|---|---|---|
| JP | 2006-72806 | 3/2006 |
| JP | 2009-31952 | 2/2009 |

(Continued)

OTHER PUBLICATIONS

Patent Abstracts of Japan, Publication No. 2006-072806, published Mar. 16, 2006.
(Continued)

*Primary Examiner* — John T Repsher, III
(74) *Attorney, Agent, or Firm* — Staas & Halsey LLP

(57) ABSTRACT

A scenario generation device includes a processor that executes a procedure. The procedure includes: detecting data representing a target object of an operation target and data representing a user operation on the target object based on objects displayed on a screen by application software operating on a computer; detecting data representing a peripheral object positioned at the target object periphery from out of the objects displayed on the screen, and detecting a positional relationship on the screen between the target object and the peripheral object; and generating a scenario in which the data representing the user operation, the data representing the target object, the data representing the peripheral object, and data representing the positional relationship are associated with each other.

18 Claims, 23 Drawing Sheets

(58) Field of Classification Search
USPC .......................................................... 715/704
See application file for complete search history.

(56) References Cited

U.S. PATENT DOCUMENTS

| | | | |
|---|---|---|---|
| 2010/0281457 A1 | 11/2010 | Ren | |
| 2011/0016110 A1 | 1/2011 | Egi et al. | |
| 2011/0283261 A1* | 11/2011 | Yun | G06F 9/4448 717/124 |
| 2012/0243745 A1* | 9/2012 | Amintafreshi | G06F 11/3692 382/103 |
| 2013/0019171 A1* | 1/2013 | Mounty | G06F 11/3688 715/704 |
| 2014/0075371 A1* | 3/2014 | Carmi | G06F 11/3438 715/781 |

FOREIGN PATENT DOCUMENTS

| | | |
|---|---|---|
| JP | 2009-32099 | 2/2009 |
| JP | 2009-187031 | 8/2009 |
| JP | 2010-198456 | 9/2010 |
| JP | 2010-231594 | 10/2010 |
| JP | 2011-22705 | 2/2011 |
| JP | 2012-18583 | 1/2012 |
| JP | 2012-221318 | 11/2012 |

OTHER PUBLICATIONS

Patent Abstracts of Japan, Publication No. 2009-187031, published Aug. 20, 2009.
Patent Abstracts of Japan, Publication No. 2010-198456, published Sep. 9, 2010.
Patent Abstracts of Japan, Publication No. 2011-022705, published Feb. 3, 2011.
Patent Abstracts of Japan, Publication No. 2012-221318, published Nov. 12, 2012.
Japanese Office Action dated Apr. 18, 2017 in related Japanese Application No. 2013-178417.

* cited by examiner

FIG. 3
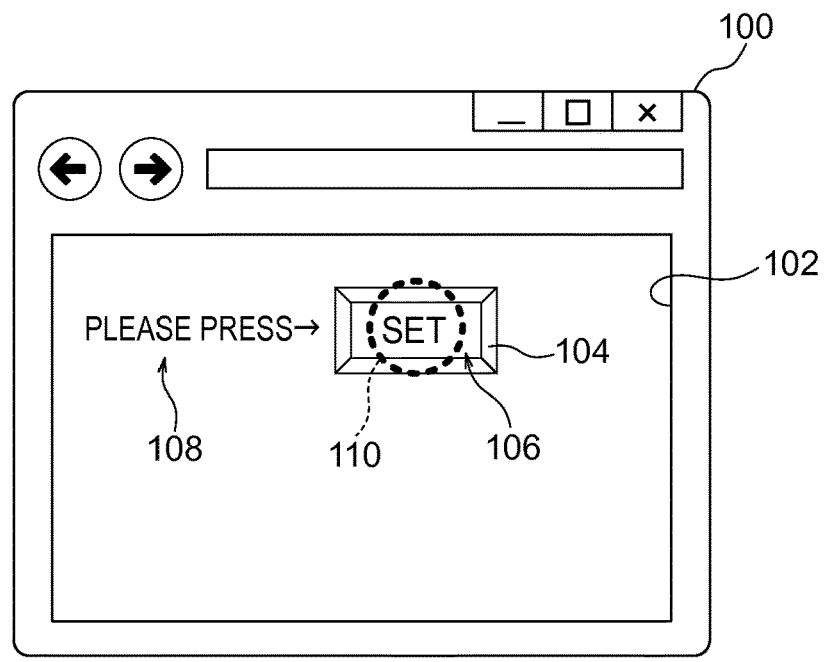
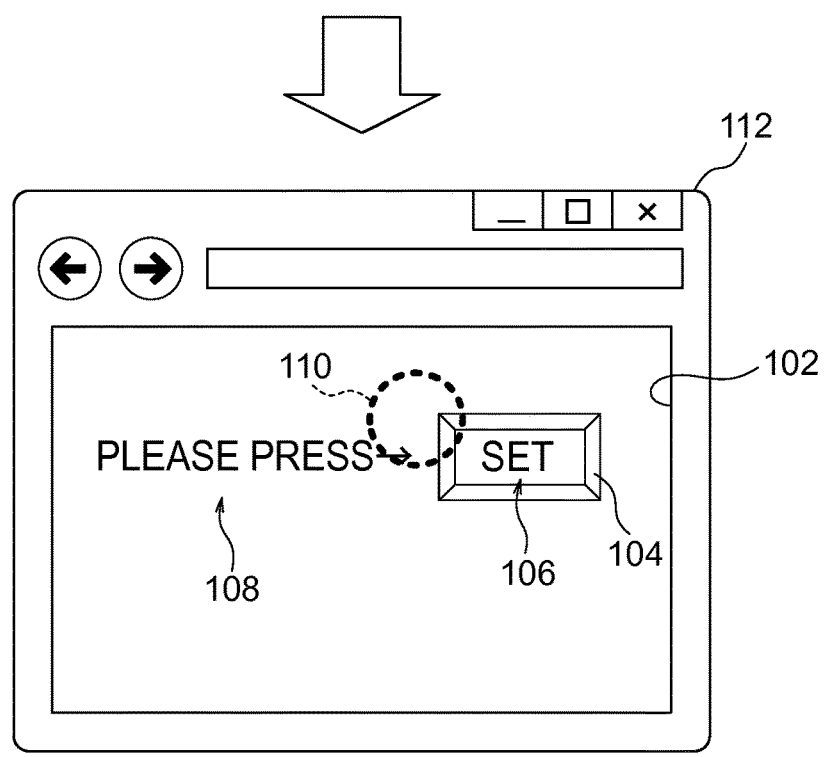

FIG. 15

| SEQ-UENCE | OPERATION TYPE | TYPE | LABEL | B1 | D1 | B2 | D2 | B3 | D3 |
|---|---|---|---|---|---|---|---|---|---|
| 1 | MOUSE | CLICK | SET | IMAGE 1 | RIGHT | PLEASE PRESS | RIGHT | MACHINE 1 | UP |
| 2 | MOUSE | CLICK | | YOUR NAME | RIGHT | YOUR ADDRESS | RIGHT UP | | |
| 3 | KEY | aaa | | | | | | | |
| 4 | KEY | {ENTER} | | | | | | | |
| 5 | MOUSE | CLICK | | YOUR ADDRESS | RIGHT | YOUR NAME | RIGHT DOWN | | |
| ... | ... | ... | ... | ... | ... | ... | ... | ... | ... |

81

FIG. 30
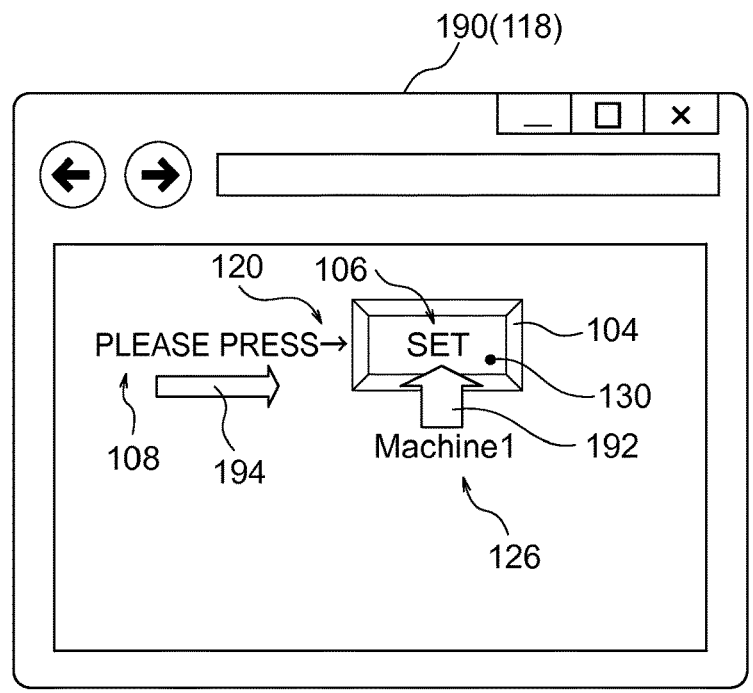
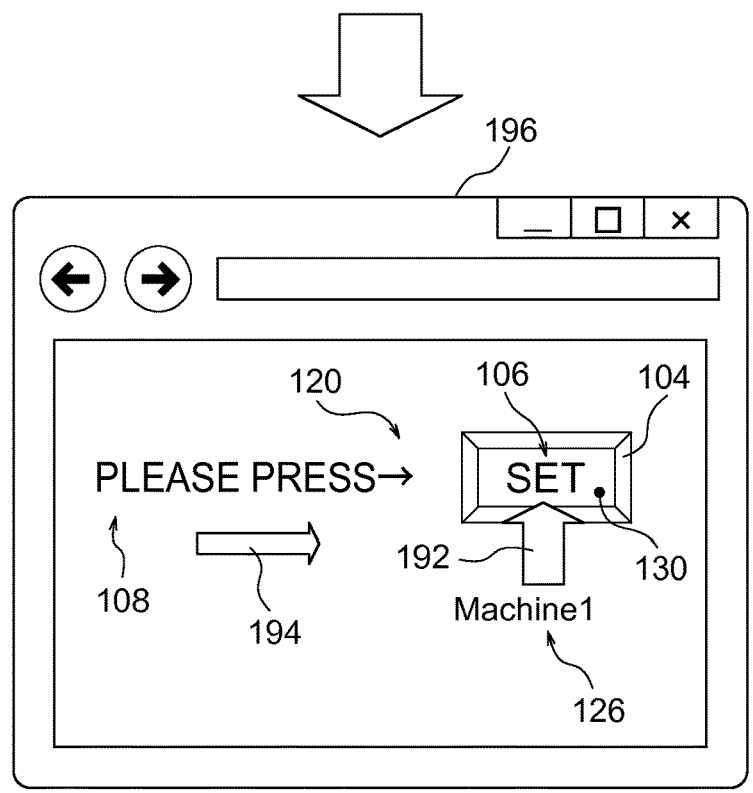

SCENARIO GENERATION METHOD IN WHICH VARIOUS DATA ARE ASSOCIATED WITH EACH OTHER, SCENARIO EXECUTION METHOD IN WHICH VARIOUS DATA ARE ASSOCIATED WITH EACH OTHER, SCENARIO GENERATION DEVICE, AND SCENARIO EXECUTION DEVICE

CROSS-REFERENCE TO RELATED APPLICATION

This application is based upon and claims the benefit of priority of the prior Japanese Patent Application No. 2013-178417, filed on Aug. 29, 2013, the entire contents of which are incorporated herein by reference.

FIELD

The embodiments discussed herein are related to a scenario generation method, a scenario execution method, a scenario generation device, and a scenario execution device

BACKGROUND

There are cases in which a graphical user interface (GUI) performed with a pointer device, such as a mouse, is employed for operations of a user in application software executed on a computer. In order to check operation during user operation for application software employing a GUI, and to check operation when there is a version upgrade thereof, there are cases in which an operation sequence of a user is recorded in a file, and testing is performed by automatically executing operation in accordance with the recorded file.

For example, an operation of a user with a GUI in application software is recorded by a computer according to the operation sequence, in what is referred to as a scenario file. Then, by automatically executing on the computer operation with the GUI in accordance with the recorded scenario, operation on the application software during user operation is checked, and operation thereon when there is a version upgrade is checked.

As an example of technology to generate scenarios to automatically execute operations using a GUI, technology is known that generates a scenario, containing an operation position, an image of a range including the operation position, and data of the operation from a display image during input operation using a mouse or the like. In operation with a GUI according to the generated scenario, the image of the range including the operation position is then treated as an object of the operation target, and the mouse cursor or the like is moved to the display position of the object of the operation target, based on the recorded operation position, and the operation (for example, what is referred to as a "click") is executed.

In order to identify the operation target displayed on a screen, technology is known to search for character data when the object of the operation target is character data. As an example of technology to generate a scenario by recording data representing a user operation and an image of a screen during user operation, technology is also known that stores in a scenario an image of a screen during operation of application software. Storing an image of a screen during user operation in a scenario enables a user to readily ascertain the operation contents, and enables easy editing of the scenario.

SUMMARY

According to an aspect of the embodiments, there is provided a computer-readable recording medium having stored therein a program for causing a computer to execute a scenario generation process, the process including:

detecting data representing a target object of an operation target and data representing a user operation on the target object based on objects displayed on a screen by application software operating on a computer;

detecting data representing a peripheral object positioned at the target object periphery from out of the objects displayed on the screen, and detecting a positional relationship on the screen between the target object and the peripheral object; and generating a scenario in which the data representing the user operation, the data representing the target object, the data representing the peripheral object, and data representing the positional relationship are associated with each other.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating examples of a window region displayed during scenario operation.

FIG. 15 is an image of a table illustrating an example of test scenarios.

FIG. 30 is a diagram illustrating an example of a window region displayed on a screen.

DESCRIPTION OF EMBODIMENTS

Detailed explanation next follows regarding examples of exemplary embodiments of technology disclosed herein, with reference to the drawings. In the present exemplary embodiment, the technology disclosed herein is applied to a case in which testing is performed of user operation with a GUI.

First Exemplary Embodiment

Figure 1:
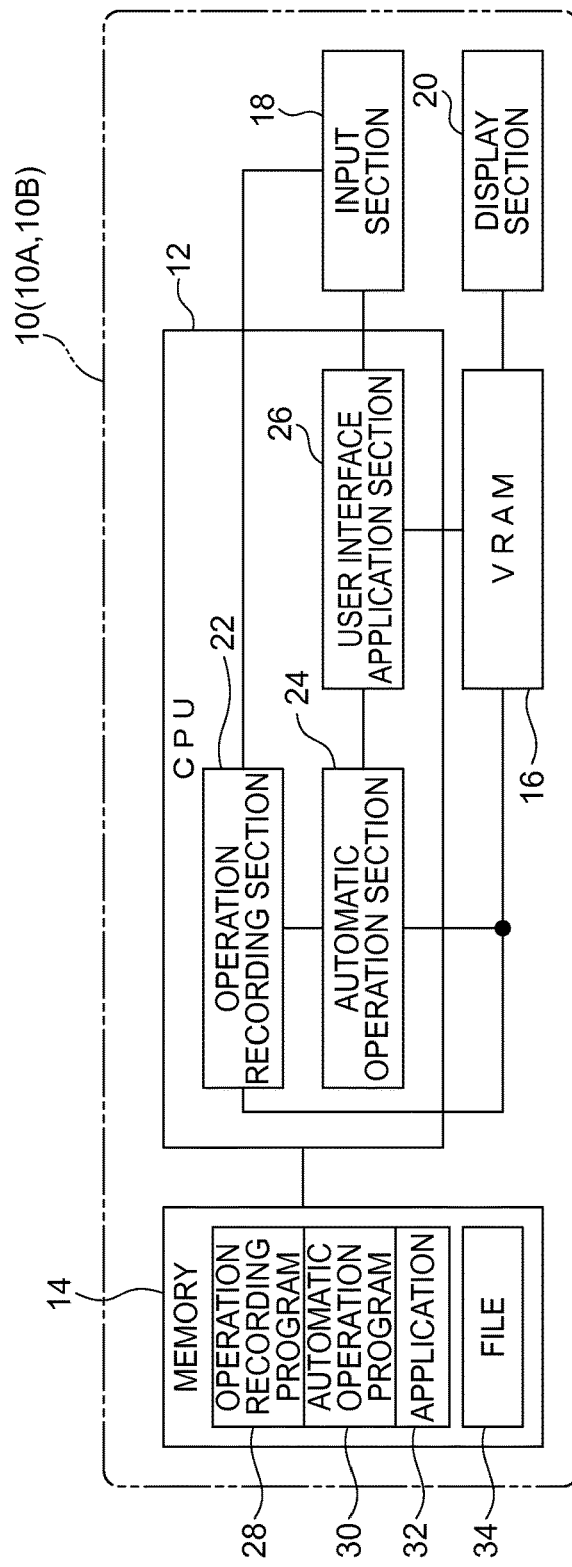
FIG. 1 is a block diagram illustrating an example of a configuration of a scenario device.

FIG. 1 illustrates an example of a scenario device 10 according to the present exemplary embodiment. The scenario device 10 is an example of a scenario execution program, and a device capable of executing processing according to a scenario generation program, of technology disclosed herein. The scenario device 10 includes a CPU 12 and a memory 14. An operation recording program 28, an automatic operation program 30, and application software 32 that employs a GUI subjected to scenario generation and scenario execution, are stored in the memory 14. Note that in FIG. 1, "application software" and "application" are illustrated for the application software 32. A file 34 containing scenarios is also stored in the memory 14. The CPU 12 operates as an operation recording section 22 by executing the operation recording program 28, the CPU 12 operates as an automatic operation section 24 by executing the automatic operation program 30. The scenario device 10 operates as a scenario generation device 10A by the CPU 12 executing the operation recording program 28. The scenario device 10 operates as a scenario execution device 10B by the CPU 12 executing the automatic operation program 30. The CPU 12 operates as a user interface application section 26 by the CPU 12 executing a GUI function provided by, for example, an Operating System (OS). The user interface application section 26 enables user operation with the GUI by executing the application software 32.

The scenario device 10 includes video RAM (VRAM) 16, an input section 18, and a display section 20, such as a display. The VRAM 16 is memory to save contents displayed on the display section 20, and saves images output from the user interface application section 26. The VRAM 16 supplies images to the operation recording section 22 and the automatic operation section 24. The input section 18 executes user input, such as by a mouse, keyboard, or touch panel, and is connected to the operation recording section 22 and the user interface application section 26.

In order to generate a scenario, the scenario device 10 executes the application software 32, and starts scenario generation processing using the operation recording section 22, by the CPU 12 executing the operation recording program 28. The operation recording section 22 detects user operation on an object, displayed on the screen of the display section 20 by execution of the application software 32, by reading input values of the input section 18. The operation recording section 22 detects the target object subject to user operation by reading in an image of objects displayed on the screen of the display section 20 from the VRAM 16. The operation recording section 22 then detects a marker to identify the target object on the image displayed on the screen of the display section 20. Namely, the operation recording section 22 detects an object displayed at the periphery of the target object to serve as a peripheral object to be a marker for the target object. The operation recording section 22 detects the positional relationship between the target object and the peripheral object. Data representing the peripheral object that has been associated with data representing the positional relationship may be employed as marker data. A scenario is then generated containing, as operation data, data representing the detected target object and operation of the user, data representing a peripheral object, and data representing a positional relationship between the target object and the peripheral object. The scenario is recorded in a file 34 of the memory 14. Thus, for operation with the GUI in the application software 32, this thereby enables operation data identifying operation on a screen to be recorded as a series of data related to operation, without recording coordinates during operation.

In order to execute a recorded scenario, the scenario device 10 executes the application software 32, and starts scenario execution processing in the automatic operation section 24 by the CPU 12 executing the automatic operation program 30. The automatic operation section 24 executes operation on an object, that is being displayed on the screen of the display section 20 by execution of the application software 32, by reading in a scenario recorded in memory. First, image data is acquired of a region capable of user operation by a user on the screen of the display section 20 by execution of the application software 32. For example, there are cases in which when, during execution of the application software 32, a display region on the screen of the display section 20 is limited to inside the frame of a window, the region capable of user operation is the outside of the window frame. The automatic operation section 24 accordingly acquires, as an image, a region capable of user operation inside or outside the window frame. Then, for a target object contained in the operation data recorded in the scenario, the automatic operation section 24 identifies, from the acquired image data, the position of the target object in the image of the region capable of user operation inside or outside the window frame. Then, based on data contained in the operation data representing the user operation on the target object, the automatic operation section 24 executes the operation on the target object at the identified position. This thereby enables the operation to be identified even in cases in which a portion of the application software 32 has been changed and the operation position has moved, enabling implementation of the scenario operation without an operation error occurring.

The scenario device 10 is an example of a scenario device of technology disclosed herein, the scenario generation device 10A is an example of a scenario generation device of technology disclosed herein, the scenario execution device 10B is an example of a scenario execution device of technology disclosed herein. The operation recording program 28 is an example of a scenario generation program of technology disclosed herein, the automatic operation program 30 is an example of a scenario execution program of technology disclosed herein. The application software 32 is an example of application software of technology disclosed herein.

Figure 2:
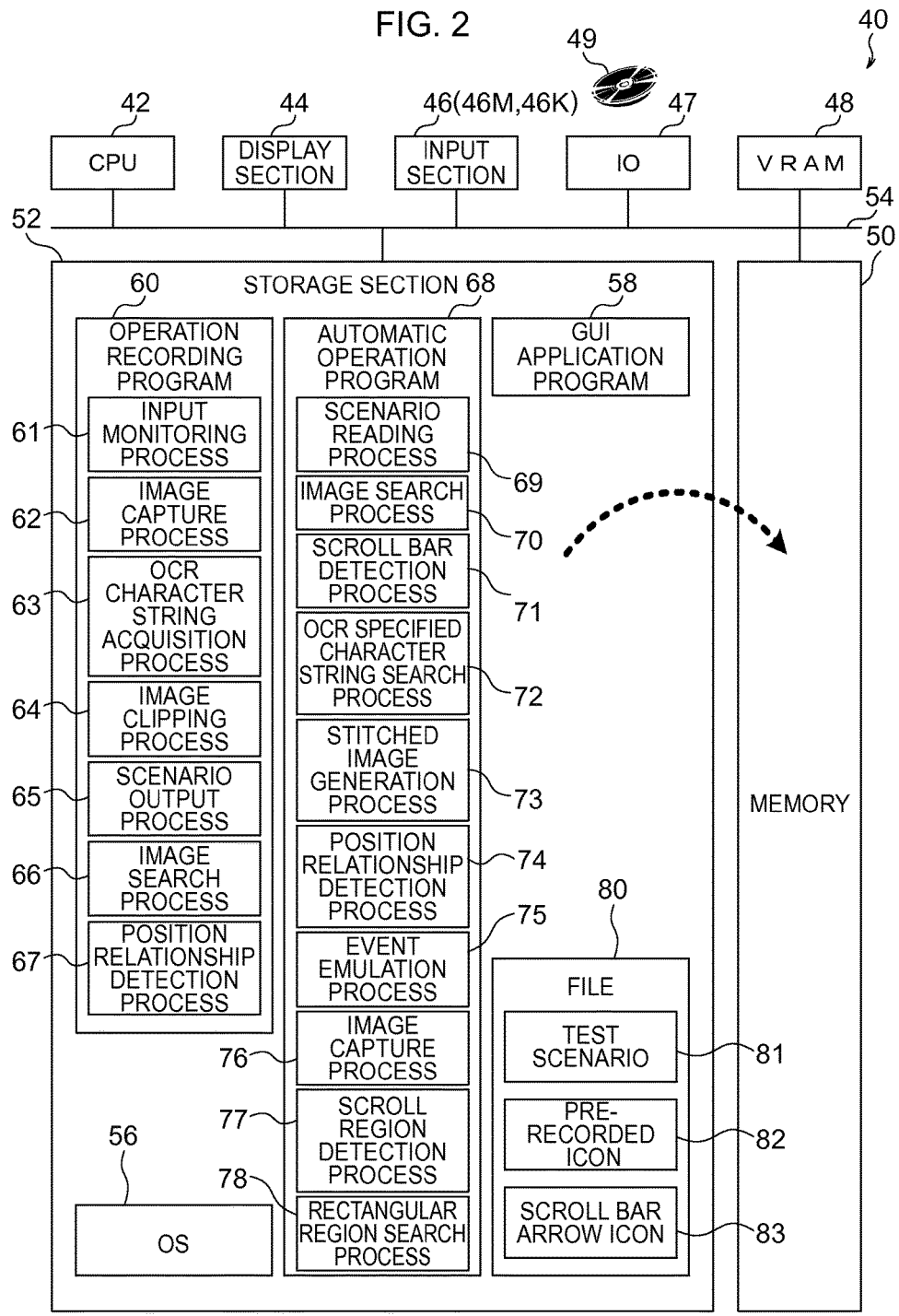
FIG. 2 is a block diagram illustrating an example of a scenario device implemented by a computer according to a first exemplary embodiment.

FIG. 2 illustrates an example of an implementation of the scenario device 10 by a computer 40. The computer 40 includes a CPU 42, a memory 50, and a non-volatile storage section 52. The CPU 42, the memory 50, and the storage section 52, are connected together through a bus 54. The computer 40 also includes a display section 44, such as a display, and an input section 46, such as a keyboard or mouse. The display section 44 and the input section 46 are connected to the bus 54. The computer 40 includes a device (IO device) 47, that is connected to the bus 54, is inserted with a recording medium 49, and performs read-writing processing on the inserted recording medium 49. The computer 40 includes VRAM 48 connected to the bus 54. The storage section 52 may be implemented, for example, by a Hard Disk Drive (HDD) or a flash memory. The computer 40 may be equipped with an interface for connection to a computer network or the like.

An Operating System (OS) 56 is stored on the storage section 52, together with an operation recording program 60 and an automatic operation program 68 to make the computer 40 function as the scenario device 10. A GUI application program 58 and a file 80 are also stored on the storage section 52. The CPU 42 causes the computer 40 to operate as the user interface application section 26 illustrated in FIG. 1, by executing the OS 56 and the GUI application program 58. The GUI application program 58 corresponds to the application software 32 illustrated in FIG. 1. The GUI application program 58 is replaceable as a test program for determining the suitability of a GUI device (detailed explanation below).

The operation recording program 60 stored on the storage section 52 includes an input monitoring process 61, an image capture process 62, an OCR character string acquisition process 63, an image clipping process 64, a scenario output process 65, an image search process 66, and a position relationship detection process 67. The CPU 42 reads the operation recording program 60 from the storage section 52, expands the operation recording program 60 in the memory 50, and causes the computer 40 to operate as the scenario device 10 and the scenario generation device 10A illustrated in FIG. 1 by executing each of the processes in the operation recording program 60. The CPU 42 causes the computer 40 to operate as the operation recording section 22 illustrated in FIG. 1 by executing the operation recording program 60. The operation recording program 60 corresponds to the operation recording program 28 illustrated in FIG. 1.

The automatic operation program 68 stored in the storage section 52 includes a scenario reading process 69, an image search process 70, a scroll bar detection process 71, an OCR specified character string search process 72, and a stitched image generation process 73. The automatic operation program 68 includes a position relationship detection process 74, an event emulation process 75, an image capture process 76, a scroll region detection process 77, and a rectangular region search process 78. The CPU 42 causes the computer 40 to operate as the scenario device 10 and the scenario execution device 10B illustrated in FIG. 1 by reading the automatic operation program 68 from the storage section 52, expanding the automatic operation program 68 in the memory 50, and executing each of the processes in the automatic operation program 68. The CPU 42 causes the computer 40 to operate as the automatic operation section 24 illustrated in FIG. 1 by executing the automatic operation program 68. Note that the automatic operation program 68 corresponds to the automatic operation program 30 illustrated in FIG. 1.

A file 80, containing a test scenario 81, pre-recorded icons 82, and scroll bar arrow icons 83, is stored in the storage section 52. The file 80 corresponds to the file 34 illustrated in FIG. 1.

Note that the scenario device 10 may be connectable to a computer network. Namely, the scenario device 10 is not limited to being connected to a computer network, or to not being connected to a computer network. The scenario device 10 may be implemented by a single computer 40 alone, as in the illustrated example of the scenario device 10, or may be implemented by plural computers.

In order to implement automatic operation according to a scenario in which user operation with the GUI is stored, an operation position, such as coordinates, on a screen is generally recorded in a scenario, and operation is executed at the recorded operation position, such as coordinates. However, in some cases, application software employing a GUI has a content change or a version upgrade that affects the GUI. For example, there are cases in which the character size for screen display is changed, or a window size for screen display is changed.

When changes occur in the character size for screen display, or changes occur in the window size, there are cases in which the operation position recorded in a scenario, by a mouse or the like, such as the coordinates on a screen, also move according to the character size or the window size. For example, when contents of application software are changed to give a larger or smaller character size than the character size when the scenario was recorded, the operation position, such as the coordinates on a screen, move according to the difference in character size before and after the change. When operation positions in the vicinity of the outline of a window are recorded in a scenario, and the contents of application software are changed to give a window smaller than the window when the scenario was recorded, sometimes coordinates outside of the window are present at the operation position.

Consequently, when the operation position of the target object during scenario generation changes, operation errors occur when the operation object is not present at the operation position during scenario generation, making continuation of operation according to the scenario difficult. When an operation error has occurred, the user regenerates the already generated scenario, or corrects the already generated scenario, leading to a drop in the efficiency of operations performed using the scenario.

However, from a display image during an input operation, such as by a mouse, using technology to generate a scenario with an image including the operation position as an object of the operation target, enables the object to be identified from the image of the range including the operation position. However, due to executing operation on the target object based on the recorded operation position, if the operation position at scenario execution has moved, then in some cases operation errors occur that make continuation of operation according to the scenario difficult when the operation target is not present at the operation position, such as the coordinates. It is also difficult to identify the object recorded in a scenario in cases in which there are plural objects present in a single image. It is also difficult to identify the object in cases in which the object is present outside of the window. This results in regeneration of the already generated scenario, or correction of the already generated scenario, leading to a drop in the efficiency of operations performed using the scenario.

In cases in which the object of the operation target is character data, the characters displayed on the screen can be identified by searching for the character data. However, due to operation being executed based on the recorded operation position, an operation error occurs when the operation position at scenario execution has moved from the position at scenario generation, making continuation of operation according to the scenario difficult. In technology that records data representing user operation and an image of a screen during user operation, operation is executed based on the recorded operation position, and so operation errors occur when the operation position at the time of scenario execution has moved, making continuation of operation according to the scenario difficult.

An object of one aspect is, in cases in which operation on application software is executed by a computer, to easily identify an operation target at scenario reproduction.

Simple explanation follows here of a case in which user operation with respect to an object displayed on a screen of the display section 44 by the input section 46, such as a mouse, is recorded in a scenario.

FIG. 3 illustrates window regions 100, 112 displayed on the screen of the display section 44 by execution of the application software 32. When generating a scenario, the window region 100 represents a window region displayed on the screen of the display section 44 by execution of the application software 32. The window region 112 represents a window region displayed on the screen of the display section 44 by execution of the application software 32, in which the character size has been changed after scenario generation. The window region 100 includes an input-output window region 102 capable of user operation on objects in the application software 32. A button image 104 that is an object to be the target of user operation is displayed in the input-output window region 102. The character string data 106 with the characters "SET" is displayed in the button image 104. Character string data 108 is also displayed on the input-output window region 102, with the characters "please press" to urge operation on the button image 104 by the input section 46, such as by a mouse.

In order to generate the scenario of the example in FIG. 3, consider a case in which, as user operation with the input section 46, a pointer is moved to the button image 104, and a position 110 is instructed by a click operation. Recording the position (coordinates) 110 at the time of click operation in the scenario enables user operation to be reproduced by making a click operation at the recorded position 110. However, if, after scenario generation, alteration is performed that changes the size of the character size in the application software 32, then the display position of the button image 104 is moved. Thus, when a click operation is made at the recorded position 110, the target object (button) is not present, and so user operation is not reproducible.

Figure 4:
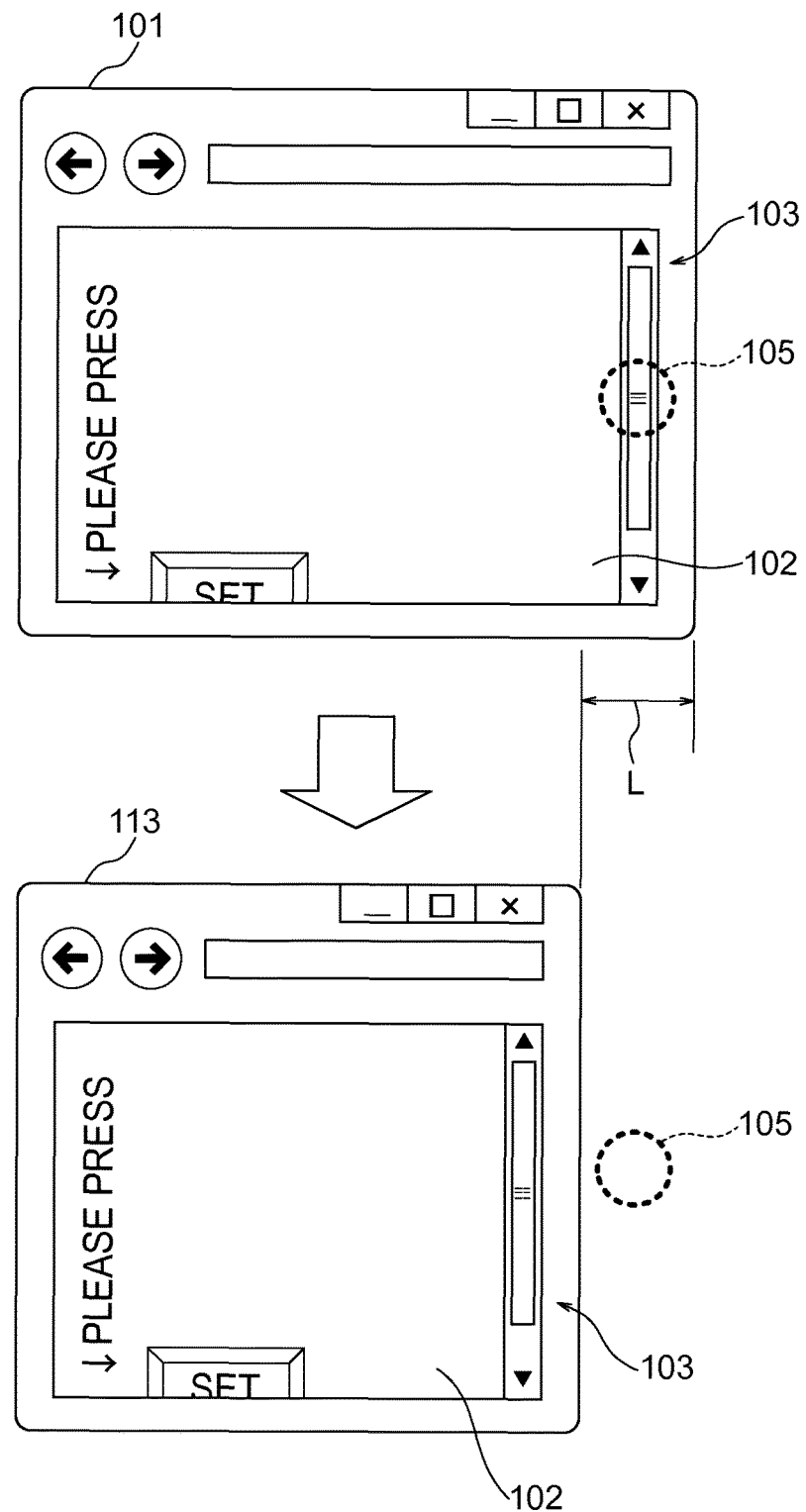
FIG. 4 is a diagram illustrating examples of a window region displayed during scenario operation.

FIG. 4 illustrates window regions 101, 113 as other examples displayed on the screen of the display section 44. The window region 101 illustrates a window region displayed on the screen of the display section 20 by executing the application software 32 during scenario generation. The window region 113 is a window region displayed on the screen of the display section 44 by executing the application software 32 in which the size of the window region 101 has been changed after scenario generation. The window region 113 has a horizontal direction size of window region 113 that is smaller than that of the window region 101, by distance L. The window regions 101, 113 contain a scroll bar region image 103 for moving an image displayed in the input-output window region 102.

In order to generate the scenario of the example in FIG. 4, consider a case in which, as a user operation, a pointer is moved to the scroll bar region image 103, and after the position 105 has been instructed by a click operation, the image displayed in the input-output window region 102 is then moved by a drag operation. However, since the size of the window region 113 is small in the horizontal direction, the display position of the scroll bar region image 103 is moved. Hence, even if a drag operation is made at the position of the recorded position 105, the target object (the scroll bar) is not present and the user operation is not reproducible.

To address this, in the present exemplary embodiment, a peripheral object to the target object is recorded in a scenario as a marker, without recording the position coordinates of the target object on the screen, and the target object is identified based on the marker.

Explanation next follows regarding operation of the present exemplary embodiment.

Figure 5:
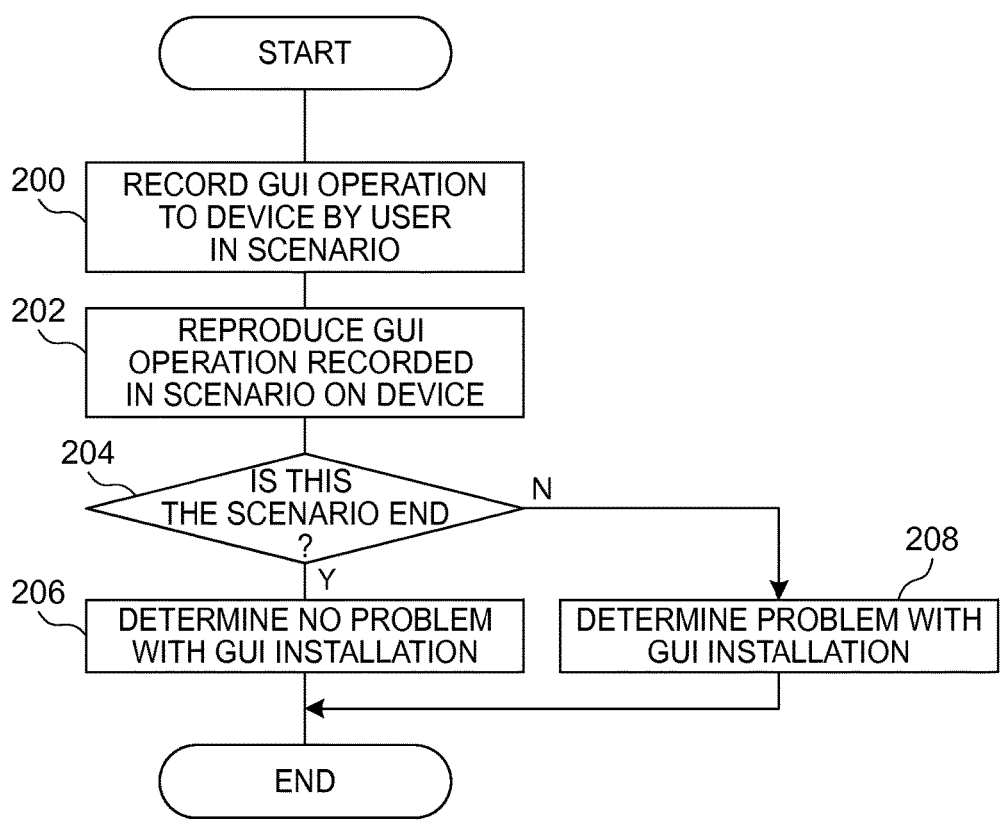
FIG. 5 is a flow chart illustrating an example of flow of GUI text in a scenario device.

FIG. 5 illustrates an example of flow of a GUI test of the application software 32 in the scenario device 10.

First the scenario device 10 records a scenario by operation by a user (step 200). Namely, at step 200, by executing the application software 32, the CPU 42 records in the test scenario 81 a user operation performed on the screen on which an object is being displayed by the display section 20. Then the scenario device 10 reproduces the GUI operation recorded in the scenario (step 202). Namely, the CPU 42 reproduces the user operation according to the recorded test scenario 81. The scenario device 10 then determines whether or not GUI installation is suitable by determining whether or not it has been possible to complete the user operation in the scenario. Namely, at step 204, the CPU 42 determines whether or not all user operations recorded in the scenario have been completed, and when affirmative determination is made, determines at step 206 that there is no problem with GUI installation. However, when negative determination is made at step 204, the CPU 42 determines at step 208 that there is a problem with the GUI installation.

The processing of step 200 of FIG. 5 corresponds to the processing by the operation recording program 60, and the processing of step 202 to step 208 of FIG. 5 corresponds to the processing of the automatic operation program 68.

Figure 6:
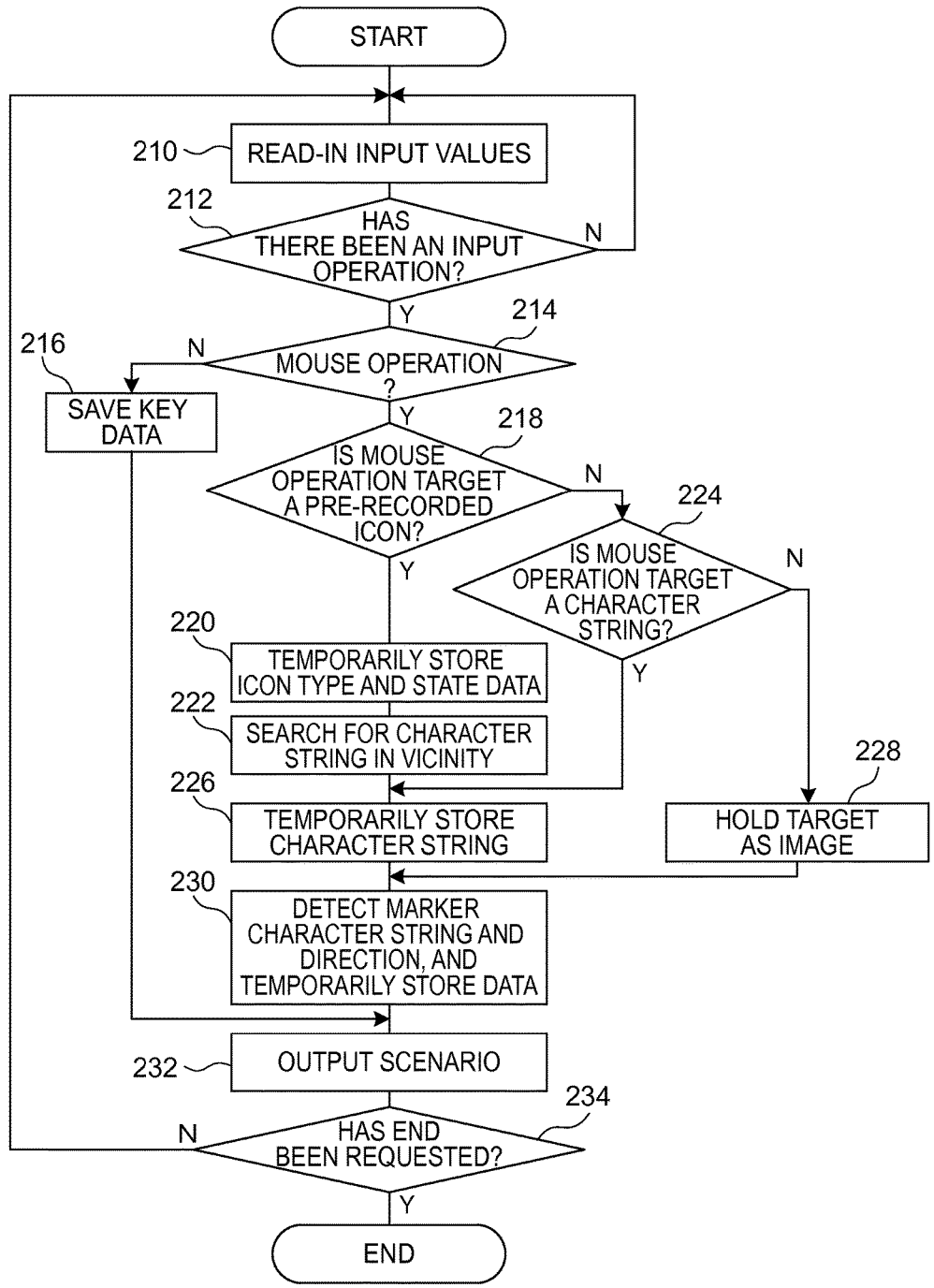
FIG. 6 is a flow chart illustrating an example of a flow of processing of an operation recording program.

FIG. 6 illustrates an example of a flow of processing of the operation recording program 60. Note that in the following explanation, a case is explained in which a mouse 46M and a keyboard 46K are employed as an example of the input section 46.

In the display section 44, the position of display of the mouse cursor corresponds to movement of the mouse. The mouse 46M is equipped with a mouse button. A depressed state of the mouse button corresponds to mouse-down, and the state of the mouse button after returning from being depressed is a state corresponding to a mouse button state of mouse-up. Detection of the position of the mouse cursor and the mouse button state may employ an Application Program Interface (API) included as standard in the OS 56. It is possible to implement the mouse button state by hooking a mouse-down or mouse-up event. The user is able to perform a drag operation by using the mouse 46M. In the computer 40, determining whether or not a drag operation has been performed may be performed by computing a separation distance, such as a Euclidean separation distance, between coordinates of the mouse cursor position at mouse-button-down and at mouse-button-up, and determining drag has occurred when a specific threshold value has been exceeded.

Of various APIs, an API (GetCursorPos) that acquires the position of a mouse cursor is known as an example of a Microsoft Windows (registered trademark) API. An API (SendInput/mouse_event) that detects a mouse button event occurrence is known as an example of an API related to a mouse. An API (called a global hook) that acquires mouse button events is also known. An API (Bitblt) that acquires a screen shot is also known.

First, the CPU 42 executes each of the processes included in the operation recording program 60. More specifically, at step 210 and step 212, the CPU 42 monitors input by the mouse 46M and the keyboard 46K by executing the input monitoring process 61. More precisely, at step 210, the CPU 42 reads in the input values by the mouse 46M and the keyboard 46K. The CPU 42 makes negative determination and returns to step 210 until input (input by the user) is performed with the mouse 46M or the keyboard 46K. When input (input by the user) has been performed with the mouse 46M or the keyboard 46K, the CPU 42 makes affirmative determination at step 212, and then at step 214 determines whether or not the input operation was from the mouse 46M. The CPU 42 makes affirmative determination at step 214 when the input operation was from the mouse 46M, and transitions processing to step 218. However, the CPU 42 makes negative determination at step 214 when input operation was by the keyboard 46K, saves key data at step 216, and transitions processing to step 232.

Namely, at step 210, the CPU 42 detects a position of the mouse cursor and a mouse button event, or a keyboard event. Then, when a keyboard event has been detected (affirmative determination at step 212 and negative determination at step 214), the CPU 42 then saves the key data (step 216), and transitions processing to step 232. However, when a mouse button event has been detected (affirmative determination at step 212 and step 214), the CPU 42 transitions processing to step 218.

Then, at step 218, the CPU 42 executes the image capture process 62 and the image search process 66. More precisely, an image of the screen of the display section 44 is acquired by executing the image capture process 62, and, by executing the image search process 66, an image matching the image of a region including the operation position by the mouse 46M is searched for in the pre-recorded icons 82 saved in the file 80. Namely, at step 218, the CPU 42 determines whether or not the image containing the operation position by the mouse 46M is an image of an icon already recorded in the file 80 as a pre-recorded icon 82. Determination as to whether or not there is an already recorded icon may be performed by determining whether or not there is a pre-recorded icon image that matches an image of a specific size containing the position of the mouse cursor when the mouse 46M was operated.

When the image containing the operation position by the mouse 46M is a pre-recorded icon image, the CPU 42 makes an affirmative determination at step 218, and, at step 220, temporarily stores data representing the type and state of the icon. The CPU 42 then, at step 222, executes the OCR character string acquisition process 63, searches for a character string present in the vicinity of the image of the icon, temporarily stores character string data of the search result at the next step 226, and then transitions processing to step 230.

The search for a character string by execution of the OCR character string acquisition process 63 may be implemented by processing of known technology, such as by an Optical Character Reader (OCR). When the CPU 42 performs the character string search, preferably a first candidate is taken as the nearest character string in a direction determined by the type of icon. When there is no character string present in the direction determined by the type of icon, the CPU 42 preferably searches for the nearest character string in another direction, and repeats searching until a character string is found. The priority sequence of direction when searching for character strings is preferably a sequence determined for each of the types of icon.

However, when the image containing the operation position by the mouse 46M is not one of the pre-recorded icon images, the CPU 42 makes a negative determination at step 218, and then, at step 224, determines whether or not the image containing the operation position by the mouse 46M contains a character string. When the image containing the operation position by the mouse 46M contains a character string, the CPU 42 makes an affirmative determination at step 224, and transitions processing to step 226. However, when the image containing the operation position by the mouse 46M does not contain a character string, then the CPU 42 makes a negative determination at step 224, temporarily stores the image containing the operation position by the mouse 46M at step 228, and transitions processing to step 230.

Figure 7:
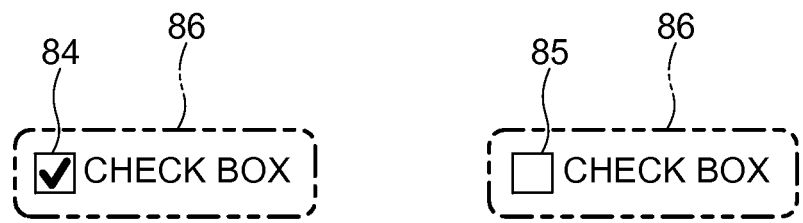
FIG. 7 is a diagram illustrating examples of an image of a check box.

FIG. 7 illustrates an image of a check box, as an example of an image of the pre-recorded icon 82. FIG. 7 illustrates a display region 86 containing a check box image 84 in an ON state and a check box image 85 in an OFF state.

For example, when a check box is clicked by the mouse 46M, it is conceivable that the state of the check box transitions in a pattern of from the ON state to the OFF state, or transitions in a pattern of from the OFF state to the ON state. Thus, both the icon ON state (the check box image 84) and the icon OFF state (the check box image 85) are recorded, and these are then searched for in the screen by executing the image search process 66. When the screen search result is that the coordinates (click coordinates) when the mouse 46M was operated are present within a rectangular region occupied by a check box image, then an operation of a check box click is recorded (step 220). In the recording at step 220, the type and the state of the pre-recorded icon 82 is also recorded. In the example of FIG. 7, check box is recorded as the type, and either the ON state or the OFF state is recorded as the state.

When the image containing the operation position by the mouse 46M is one of a pre-recorded icon, a search is made in the vicinity for a character string (step 222). In the check box example illustrated in FIG. 7, often the character string that acts as a label is positioned on the right side of the icon, and so a search is made for the first candidate of the nearest character string with the determined direction for a check box as the right side. In the example of FIG. 7, "CHECK BOX" is found as the character string.

Figure 8:
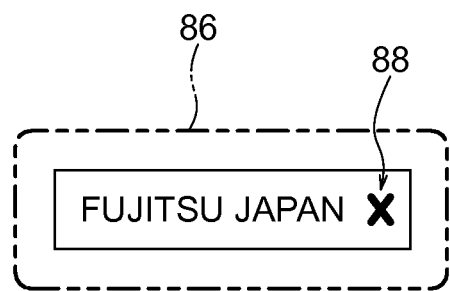
FIG. 8 is a diagram illustrating an example of an image of a close icon.

FIG. 8 illustrates an image 88 of a close icon as an example of a pre-recorded icon 82. FIG. 8 illustrates a display region 86 containing a close icon 88. Often character strings are positioned at the left side of a close icon, and so a search is made for the first candidate of the nearest character string, using the determined direction for a close icon as the left side. In the example in FIG. 8, "FUJITSU JAPAN" is found as the character string.

Figure 9:
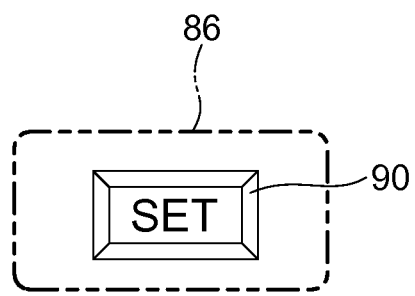
FIG. 9 is a diagram illustrating an example of an image of a button on which a character string is displayed.

FIG. 9 illustrates a button image 90 displaying a character string as an example of an image containing the operation position by the mouse 46M. FIG. 9 illustrates a display region 86 containing the button image 90 displaying the character string. It is conceivable, for example, that a button displaying a character string, and a button displaying a graphic, are operated by instructing (clicking) a character string, or not-yet recorded image, using the mouse 46M. When the CPU 42 is unable, by executing the OCR character string acquisition process 63, to acquire a character string under an operation position using the mouse 46M (negative determination at step 224), an image of a rectangular region of a specific size is clipped out and stored by executing the image clipping process 64 (step 228). In the example illustrated in FIG. 9, the button image 90 displaying the character string is clipped and stored.

Figure 10:
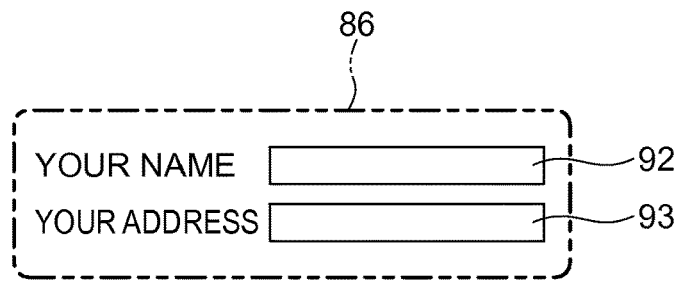
FIG. 10 is a diagram illustrating an example of an image of a text box image.

FIG. 10 illustrates textbox images 92, 93 as an example of an image containing the operation position by the mouse 46M. FIG. 10 illustrates a display region 86 containing the textbox images 92, 93. For example, it is conceivable that a textbox is a blank or empty character string under an operation position by the mouse 46M. The CPU 42 treats a blank or empty character string under an operation position by the mouse 46M (negative determination at step 224) as an image, and clips out and stores a rectangular region of a specific size (step 228).

Figure 11:
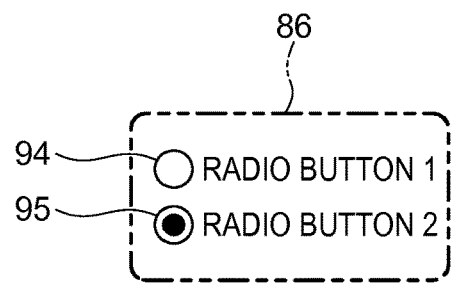
FIG. 11 is a diagram illustrating an example of an image of a radio button.

FIG. 11 illustrates an image of a radio button as an example of an image of a pre-recorded icon 82. FIG. 11 illustrates a display region 86 containing a radio button image 94 in an OFF state, and a radio button image 95 in an ON state. For example, when a radio button is clicked by the mouse 46M, it is conceivable that the state of the radio button is a pattern of a transition from the ON state to the OFF state, or a pattern of a transition from the OFF state to the ON state. Both an icon in the ON state (the radio button image 95) and an icon in the OFF state (the radio button image 94) are hence recorded, and a search is made therefor in the screen by executing the image search process 66. When the screen search result is that the coordinates (click coordinates) when the mouse 46M was operated are present within a circular region occupied by a radio button image, then an operation of a radio button click is recorded (step 220). In the recording at step 220, the type and the state of the pre-recorded icon 82 is also recorded. In the example of FIG. 11, radio button is recorded as the type, and either the ON state or the OFF state is recorded as the state. In the example of a radio button, often a character string acting as a label is on the right side of the icon, and so a search is made for the first candidate of the nearest character string with the determined direction for a radio button as the right side (step 222).

Figure 12:
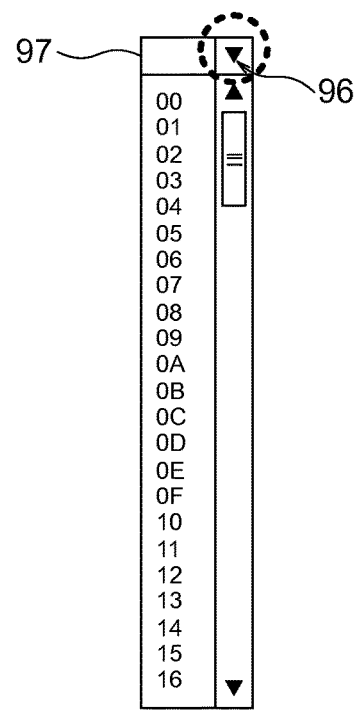
FIG. 12 is a diagram illustrating an example of an image of a combination box.

FIG. 12 illustrates a combination box image 97, as an example of an image containing the operation position by the mouse 46M. A combination box contains an icon image 96 for displaying data selectable by operation of the mouse 46M. The CPU 42 treats the absence of a character string under the operation position of the mouse 46M (negative determination at step 224) as an image, and clips out and stores a rectangular region of a specific size (step 228).

Then, at step 230 illustrated in FIG. 6, the CPU 42 detects a marker and direction for the target object, and temporarily stores the detection result. Namely, the CPU 42 takes as a target object one out of a character string resulting from the search at step 222, a character string when affirmative determination was made at step 224, or an image stored in step 228. The CPU 42 then searches the periphery of the target object for the nearest character string or image, and takes this as a peripheral object. The peripheral object of the search result is marked as the target object. The CPU 42 detects the direction from the target object of the character string or image of the search result (the peripheral object), and associates this with the peripheral object. The CPU 42 then temporarily stores data representing the peripheral object of the search result, and data representing the direction from the target object.

Then at step 232, the CPU 42 generates a scenario (described in detail below) by outputting a recorded scenario of operation data containing the temporarily stored data representing the character string or image (the peripheral object), and data representing the direction from the target object.

The CPU 42 then, at step 234, determines whether or not recording-stop has been requested. The CPU 42 returns to step 210 when negative determination is made, and ends the current processing routine when affirmative determination is made. An example of a recording-stop request may be detection by using a particular keyboard event with a low usage likelihood (for example, Ctrl+Alt+Q, or the like).

Figure 13:
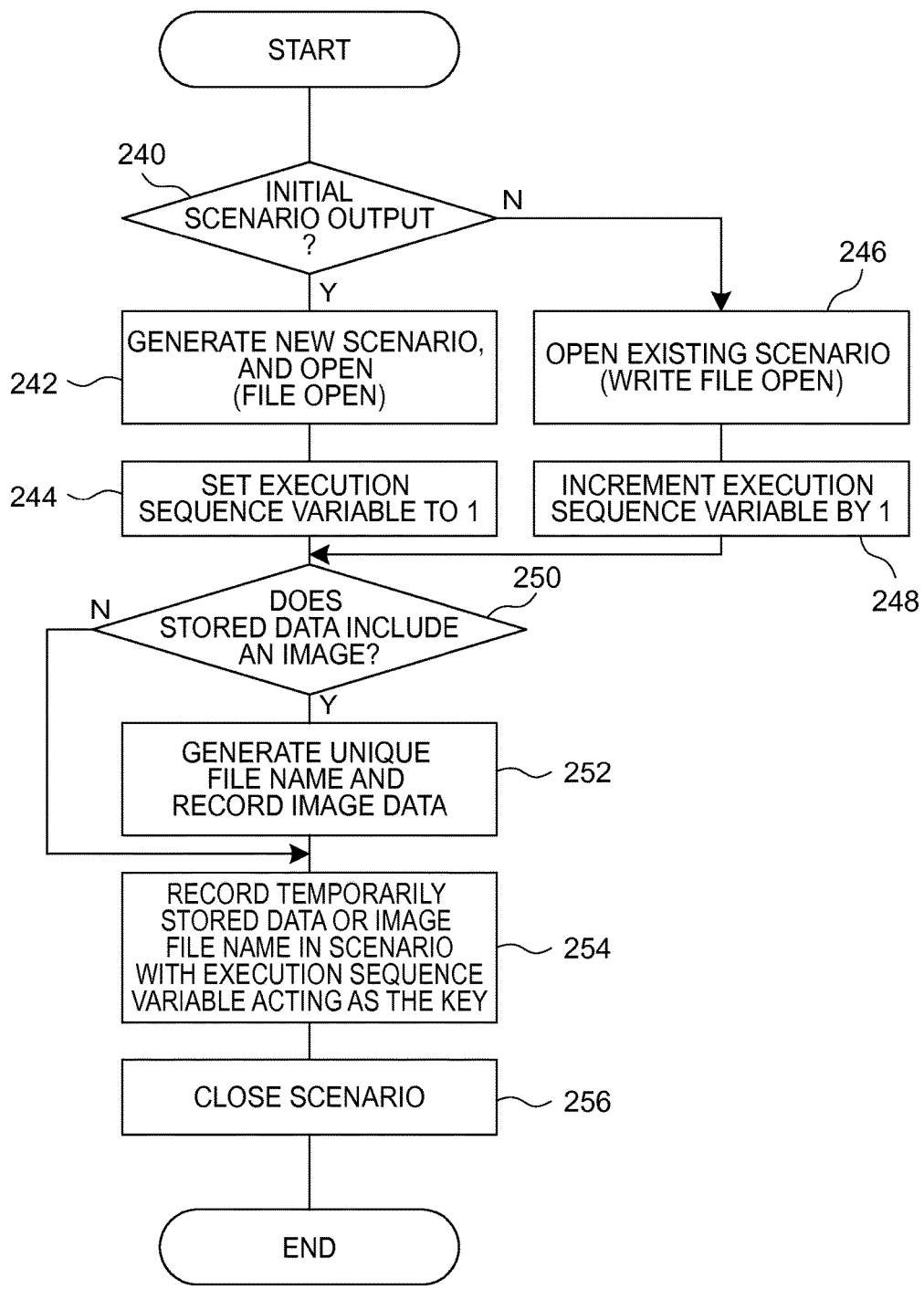
FIG. 13 is a flow chart illustrating an example of flow of processing to output a scenario.

Detailed explanation follows regarding processing of step 232 illustrated in FIG. 6, with reference to FIG. 13. In the following explanation, explanation follows of a scenario subject to processing of step 232 as the test scenario 81.

First, the CPU 42 executes the scenario output process 65 at step 232 of FIG. 6. More specifically, the CPU 42 determines whether or not there is an initial scenario output at step 240. The CPU 42 transitions to processing of step 242 when affirmative determination is made, and transitions to processing of step 246 when negative determination is made. At step 242, the CPU 42 generates a new test scenario 81, and opens the generated test scenario 81 so as to be recordable (file open). The CPU 42 then, at step 244, sets to "1" a variable representing an execution sequence when executing a GUI operation with the test scenario 81. At step 246, the CPU 42 opens an existing test scenario 81 so as to be update-recordable (write file open). Then, at step 248, the CPU 42 sets the variable representing the execution sequence when executing a GUI operation with the test scenario 81 by incrementing by "1".

The CPU 42 then, at step 250, determines whether or not image data is contained in the stored data. The stored data employed at step 250 encompasses key data saved at step 216 (FIG. 6), and data representing the type and state of an icon temporarily stored at step 220 (FIG. 6). The stored data also encompasses data representing a character string temporarily stored at step 226 (FIG. 6) and data representing an image saved at step 228 (FIG. 6). The stored data encompasses data representing a peripheral object and data representing the direction from the target object temporarily stored at step 230 (FIG. 6).

When image data is not contained in the stored data, the CPU 42 makes negative determination at step 250, and transitions processing to step 254. When there is image data contained in the stored data, the CPU 42 makes affirmative determination at step 250, appends a unique file name to the image data contained in the stored data at step 252, and then records it in the file 80 (FIG. 2). The CPU 42 then, at step 254, records the data or image file name temporarily stored in the processing of FIG. 6 in the test scenario 81, using the execution sequence variable as a key, and then, at step 256, closes the test scenario 81 (file close).

Figure 14:
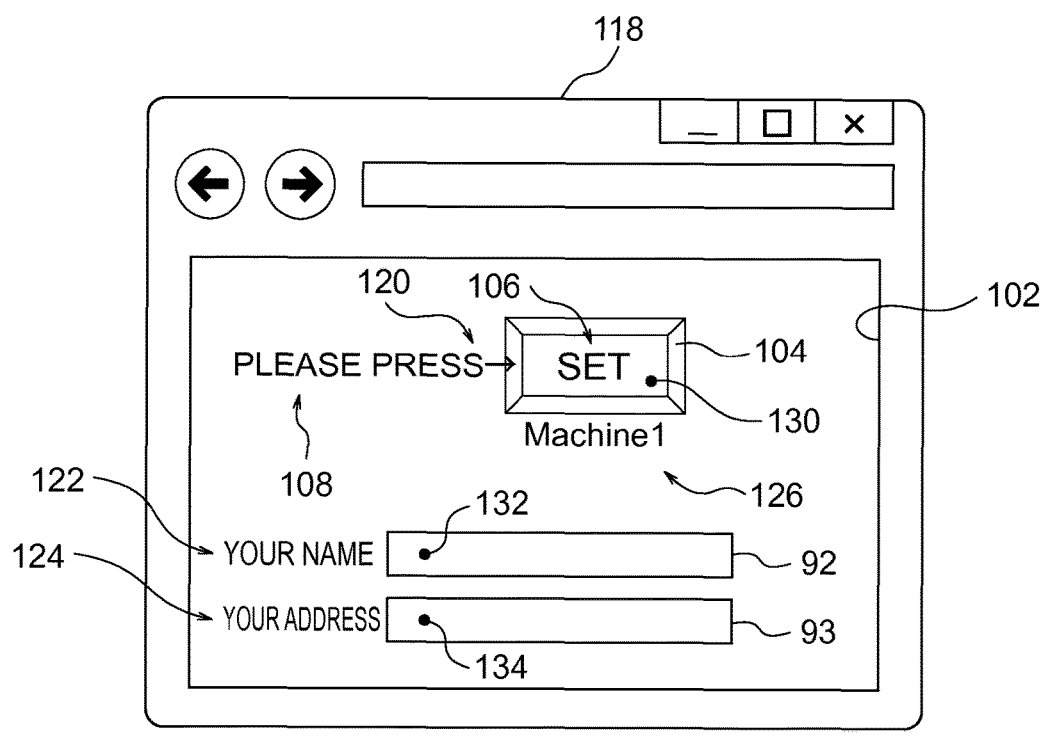
FIG. 14 is a diagram illustrating an example of a window region displayed on a screen.

FIG. 14 illustrates an example of a window region 118 displayed on the screen of the display section 20 by executing the application software 32. The window region 118 contains an input-output window region 102 in which it is possible for a user to operate on an object in the application software 32. A button image 104 displaying character string data 106 of "SET" is displayed in the input-output window region 102. An image 120 displaying an arrow sign, and character string data 108 of "PLEASE PRESS", are displayed at the periphery of the button image 104. Character string data 126 of "MACHINE 1" is displayed at the periphery of the button image 104. The textbox images 92, 93 are displayed in the input-output window region 102. Character string data 122 of "YOUR NAME" is displayed at the periphery of the textbox image 92. Character string data 124 of "YOUR ADDRESS" is displayed at the periphery of the textbox image 93.

FIG. 14 illustrates operation positions 130, 132, 134 of user operations with the mouse 46M in the input-output window region 102.

FIG. 15 illustrates an example of a test scenario 81 output when user operation is executed with the mouse 46M in sequence at the operation positions 130, 132, 134 of FIG. 14. The first row of the test scenario 81 illustrated in FIG. 15 is recorded with the operation data obtained when the mouse 46M is clicked at the operation position 130. Namely, it illustrates that the character string below the operation position 130 with the mouse 46M is "SET". Then in order to mark the character string "SET", which is the target object, to uniquely determine the target object, data representing peripheral objects, and the direction of the target object (the character string "SET") from the peripheral objects are recorded. The first marker represents the image 120 illustrating the arrow sign for the position to the left side of the button image 104 (notated image 1 in FIG. 15), and the second marker represents the character string data 108 of "PLEASE PRESS" for the position further to the left side of the button image 104. The third maker represents the character string data 126 of "MACHINE 1" for a position below the button image 104.

The second row of the test scenario 81 illustrated in FIG. 15 is recorded with the operation data obtained when the mouse 46M is clicked at the operation position 132. Namely, it illustrates that the character string below the operation position 132 with the mouse 46M is blank. The region of the blank character string is then marked to uniquely determine it as the target object, and the character string data 122 of "YOUR NAME" positioned to the left side, and the character string data 124 of "YOUR ADDRESS" positioned to the left side, are recorded. The third row of the test scenario 81 is recorded to indicate a key event, and key data of "aaa" is recorded in the column "TYPE". The fourth row of the test scenario 81 is recorded to indicate a key event, and key data of {ENTER} is recorded in the column "TYPE". The fifth row of the test scenario 81 is recorded with operation data obtained when the mouse 46M was clicked at the operation position 134.

The test scenario 81 illustrated in FIG. 15 illustrates a case in which the first to the third markers are recorded as markers to uniquely determine the target objects, but the markers are not limited to three markers. Data representing the direction from a peripheral object to the target object may be recorded as positional relationship data to uniquely determine the target object. Data representing the peripheral object and positional relationship is associated with the marker data as data to uniquely determine the target object.

The processing of step 210 executed by the CPU 42 is an example corresponding to processing of a first detection section when the computer 40 is operating as a scenario generation device. The processing of step 230 executed by the CPU 42 is an example corresponding to processing of a second detection section when the computer 40 is operating as a scenario generation device. The processing executed at step 232 by the CPU 42 is an example corresponding to processing of a generation section when the computer 40 is operating as a scenario generation device.

Explanation next follows regarding processing of automatic operation executed according to the test scenario 81.

First the CPU 42 executes each of the processes contained in the automatic manipulation program 68. More specifically, by step 300, the CPU 42 reads in the test scenario 81 by executing the scenario reading process 69. The CPU 42 then, at step 302, determines whether or not there is data representing a command to operate the mouse 46M recorded in the test scenario 81. When a command stored in the test scenario 81 is data representing an operation of the keyboard 46K, the CPU 42 makes negative determination at step 302, and, at step 304, generates the key event recorded in the test scenario 81 and transitions to processing of step 334. The CPU 42 performs the key event executed at step 304 as an emulation of a keyboard event, by executing the event emulation process 75.

When the command stored in the test scenario 81 is data representing operation of the mouse 46M, the CPU 42 makes affirmative determination at step 302, and, at step 306, acquires an image of the screen of the operation target (screen capture). The CPU 42 then, at step 308, determines whether or not there is an image representing a scroll target region present in the acquired image.

Namely, in order to estimate a scroll target region, the CPU 42 searches for a scroll bar in the image of the screen of the acquired operation target, and when a scroll bar is found, the CPU 42 identifies the handle position for scrolling in the image within the window. More specifically, the CPU 42 acquires the image of the window by executing the image capture process 76 (acquires a bit map image by taking a screen shot). The CPU 42 then executes the scroll bar detection process 71.

Icons present at both ends of a region occupied by a scroll bar (a top arrow icon and a bottom arrow icon pair, or a left arrow icon and a right arrow icon pair) are pre-recorded as the pre-recorded icons 82 of the file 80. In the scroll bar detection process 71, when the icons present at the two ends of a region occupied by a scroll bar are present at positions on the same straight line, the region between the recorded icons is determined to be a scroll bar region. When a graspable portion (a portion to the inside of buttons) is a vertical scroll bar, it is conceivable that in the image within a scroll target region, a handle for scrolling has a 1 pixel width vertical long region all of the same color, or density, relative to x coordinates of a given movable portion. The position of the handle boundary line can be identified due to the loss of continuity at the boundary line between the movable portion and the handle portion.

The CPU 42 makes an affirmative determination at step 308 when there is no image representing a scroll target region present in the acquired image, and processing transitions to step 314. However, when an image representing a scroll target region is present in the acquired image, the CPU 42 makes a negative determination at step 308, and, at step 310, identifies a rectangular region in the screen as the scroll target by executing the scroll region detection process 77. The CPU 42 then, at step 312, generates a stitched image representing the entire scroll region by executing the stitched image generation process 73. After completing generation of the stitched image, the CPU 42 then transitions to processing of step 314.

The processing of step 310 is capable of identifying a rectangular region in the screen as the scroll target from the scroll bar region in the acquired image.

Figure 17:
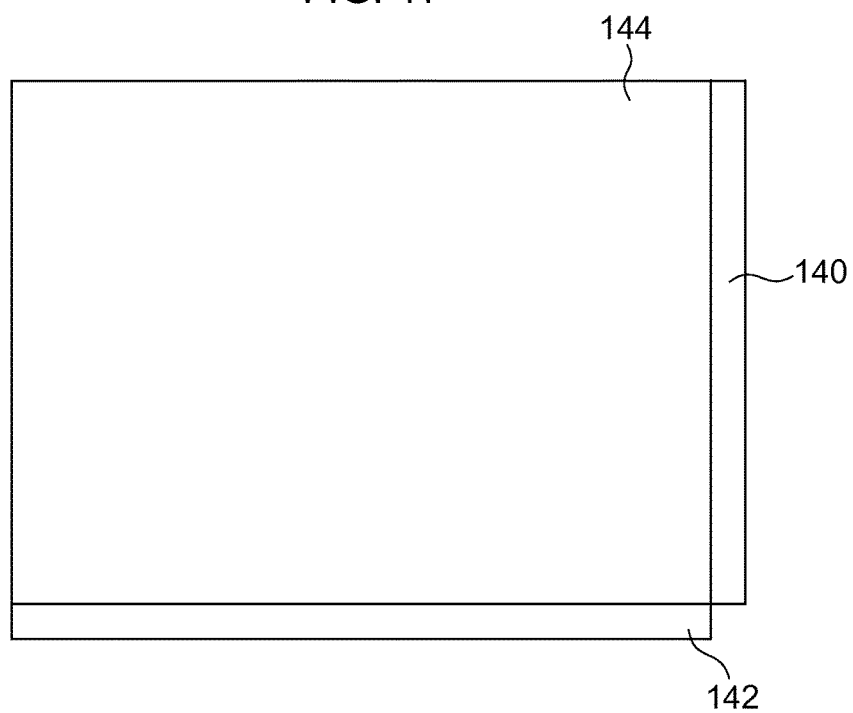
FIG. 17 is an explanatory diagram of a scroll bar region.

FIG. 17 illustrates a diagram in which a rectangular region is estimated when there are both a vertical scroll bar region 140 and a horizontal scroll bar region 142 present as scroll bar regions in the screen. When both the regions of the vertical scroll bar region 140 and the horizontal scroll bar region 142 are present in the screen, it is possible to estimate a rectangular region (scroll target region) 144 as the scroll target from the two occupied regions. Namely, the scroll target region 144 is estimated by taking the vertical scroll bar region 140 and the horizontal scroll bar region 142 as edges thereof.

Figure 18:
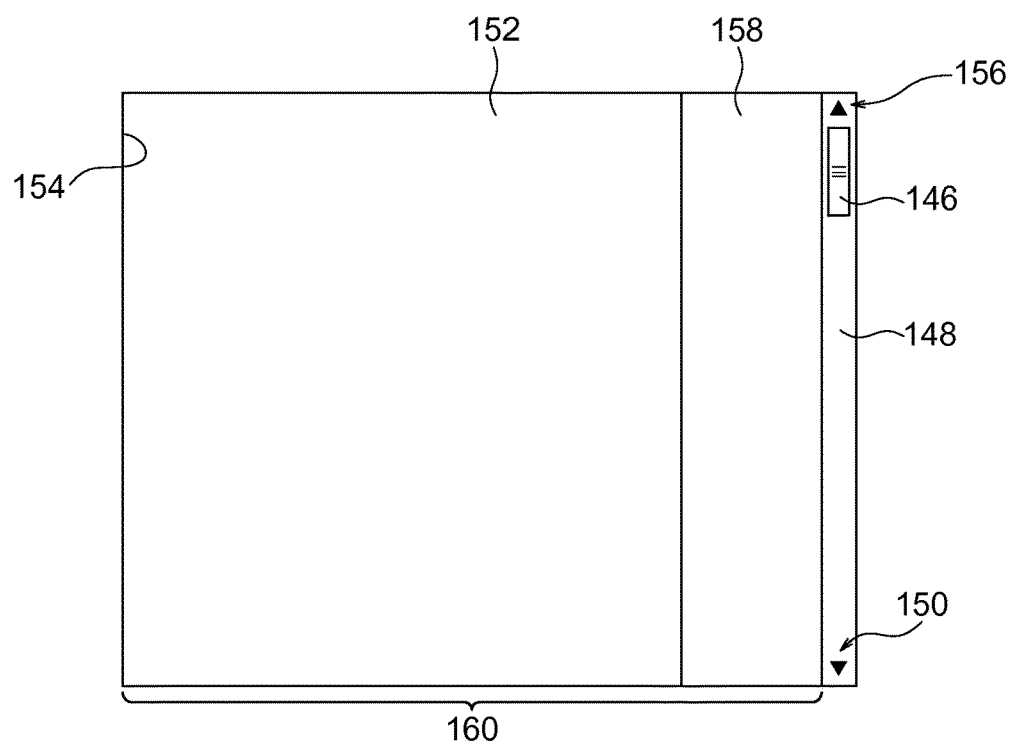
FIG. 18 is an explanatory diagram of a vertical scroll bar region.

FIG. 18 illustrates an image in which the scroll target region is estimated when there is only the vertical scroll bar region 140 present as a scroll bar region in the screen. The following first processing to eighth processing executed by the CPU 42 is an example of processing to estimate a scroll target region when there is only the vertical scroll bar region 140 present as a scroll bar region.

In the first processing, the CPU 42 moves a handle 146 of a vertical scroll bar to the top end in a vertical scroll bar region 148. In the second processing, the CPU 42 acquires an image of the screen (screen shot). In the third processing, the CPU 42 depresses a lower button 150 in the vertical scroll bar region 148. In the fourth processing, the CPU 42 once again acquires an image of the screen (screen shot). In the fifth processing, the CPU 42 extracts all the changed points in the screen, and derives a changed region 152 containing all of the changed points and a non-changed region 158. In the sixth processing, the CPU 42 derives an x coordinate of a left edge 154 in the changed region 152, so as to determine the left edge of a rectangular region. In the seventh processing, the CPU 42 derives the right edge, top edge and bottom edge of the changed region 152. These can be derived from out of the changed region 152 derived by the fifth processing. In the eighth processing, the CPU 42 depresses a top button 156 in the vertical scroll bar region 148, and returns the handle 146 to its uppermost position, storing the position of the handle as the uppermost portion. The CPU 42 is able to estimate a scroll target region 160 (the scroll target region 144) by executing the processing of the first processing to the eighth processing.

The main data in the screen has an upper portion with high frequency and many changed points, and so although the handle 146 is moved to the top end in the first processing, this is not limitation to moving the handle 146 to the top end. The number of times depressing is performed in the third processing is also not limited to one time, and precision is improved by repeating this plural times, while making a tradeoff with processing speed. When depressing has been performed plural times in the third processing, the number of times to return the position of the handle 146 to the uppermost position is the same number of times in the eighth processing. However, when the CPU 42 executes the first processing to the eighth processing, even if there is, for example, a scroll target region as internal processing, when an image of the same color and same density continues at a left end of the region, the left end of the region is not treated as being a scroll target region. However, since it can be considered that a location where an image of the same color and density continues is not an operation target or an object to confirm, this does not impede operation.

Moreover, in the above, explanation has been given of a case in which the scroll target region is estimated when there is only the vertical scroll bar region 140 present as a scroll bar region in the screen, but similar estimation may be performed when there is only the horizontal scroll bar region 142 present.

Explanation next follows regarding processing of the stitched image generation process 73 executed by the CPU 42 at step 312. The processing that the CPU 42 executes at step 312 is broadly categorized into image acquisition processing by screen division, and image stitching processing to stitch plural acquired images together into a stitched image.

In the image acquisition processing by screen division, the CPU 42 determines the number of screen divisions for acquiring the image, and then acquires an image within a window each time the handle of the scroll bar is drag operated (screen shot acquisition).

Figure 19:
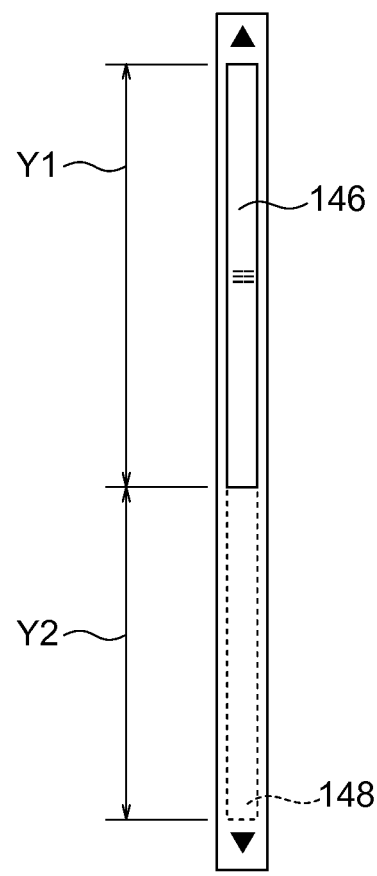
FIG. 19 is an explanatory diagram of a procedure for determining coordinates during a drag operation.

FIG. 19 is an explanatory diagram of a procedure for determining coordinates when a drag operation is performed on a vertical scroll bar. In a drag operation, an operation cycle of mouse down→mouse move→mouse up is performed. An example of processing executed by the CPU 42 for a drag operation in order to determine the coordinates during a mouse move, is the following first procedure to fifth procedure.

At the first procedure, the CPU 42 moves the handle 146 to the top end (right end) and determines the coordinates of mouse down. The coordinates of mouse down may be anywhere within the region of the handle 146. The CPU 42 then, in the second procedure, determines an individual number n of stop points of the handle 146 on the scroll bar region 140 (the number of screen divisions in the vertical direction or the horizontal direction). The CPU 42 then, in the third procedure, derives a pixel number of a difference (separation distance Y2) between the size (distance Y1) of the handle 146 of the scroll bar, and the size of the vertical scroll bar region 148 that is a movable range, and divides by the individual number n. At the fourth procedure, the CPU 42 then derives the coordinates for each of the stop points in a mouse move by, for each stop point, adding integer times (0 times, 1 times, 2 times, and so on) the numerical value (the quotient) derived at the third procedure to the y coordinate (or the x coordinate) determined at the first procedure. Then, since the handle 146 moves by the mouse move difference value, at the fifth procedure, the CPU 42 takes the location for mouse down from the second time onwards as the position of the moved distance added to the coordinates of the first procedure.

Note that when determining the individual number n in the second procedure, in order to overlap regions of the same image for stitching together in image stitching processing, described later, preferably at least a portion of the images (screen shots) acquired overlap to make a screen grid. It is possible to obtain a stitched image with high precision by making the individual number n a large value. However, since the time taken to acquire the image is greater the larger the individual number n is, the individual number n is determined as a tradeoff. As an example of a determining method, there is a method of "dividing the size of the movable range by the size of the handle, and rounding up any decimal places". An example of such a determining method, is a method preferably based on a case in which a scroll bar is installed with the ratio of the length of the handle 146 to the size of the scroll region as the ratio of the length of the vertical scroll bar region 148, that is the movable range, to the size of the entire screen.

A drag operation may be substituted by operation to click a button of the direction to be scrolled in regions of the movable range (the vertical scroll bar region 148) other than the handle 146. However, when using an operation of clicking the button in the direction to be scrolled, the scroll bar is re-detected every click operation in a similar manner to the processing of steps 306 and 308, to re-confirm the position of the handle 146.

If the individual number n is determined as value a for a vertical scroll bar, and the individual number n is determined as value b for a horizontal scroll bar, then the number of times to acquire an image (screen shot) is the multiple value (a·b) of value a and value b.

Explanation next follows regarding image stitching processing to connect together plural acquired images into a stitched image. In image stitching processing, in order to connect together plural acquired images into a stitched image, the CPU 42 connects together an image of an overlapping region of the maximum length match in bit map images. In order to stitch together images with the maximum length overlapping region, the portion determined to be the overlapping region is removed from one or other of the images, and they are then stitched together.

Figure 20:
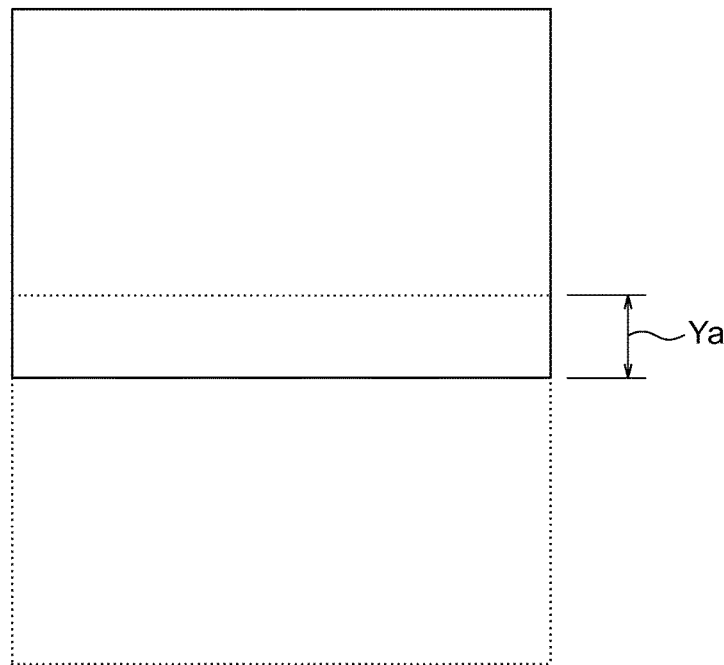
FIG. 20 is an explanatory diagram illustrating an example of a case in which upper and lower images are stitched together.
Figure 21:
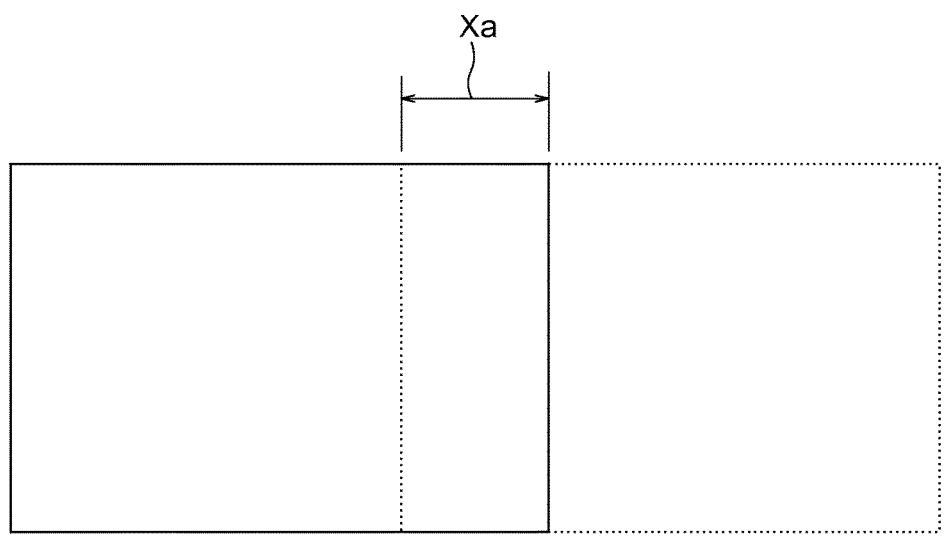
FIG. 21 is an explanatory diagram illustrating an example of a case in which left and right images are stitched together.

FIG. 20 illustrates an example of a case in which overlapping regions of maximum length Ya at the top and bottom of respective images are stitched together. FIG. 21 illustrates an example of a case in which overlapping regions of maximum length Xa at the left and right of respective images are stitched together.

Figure 22:
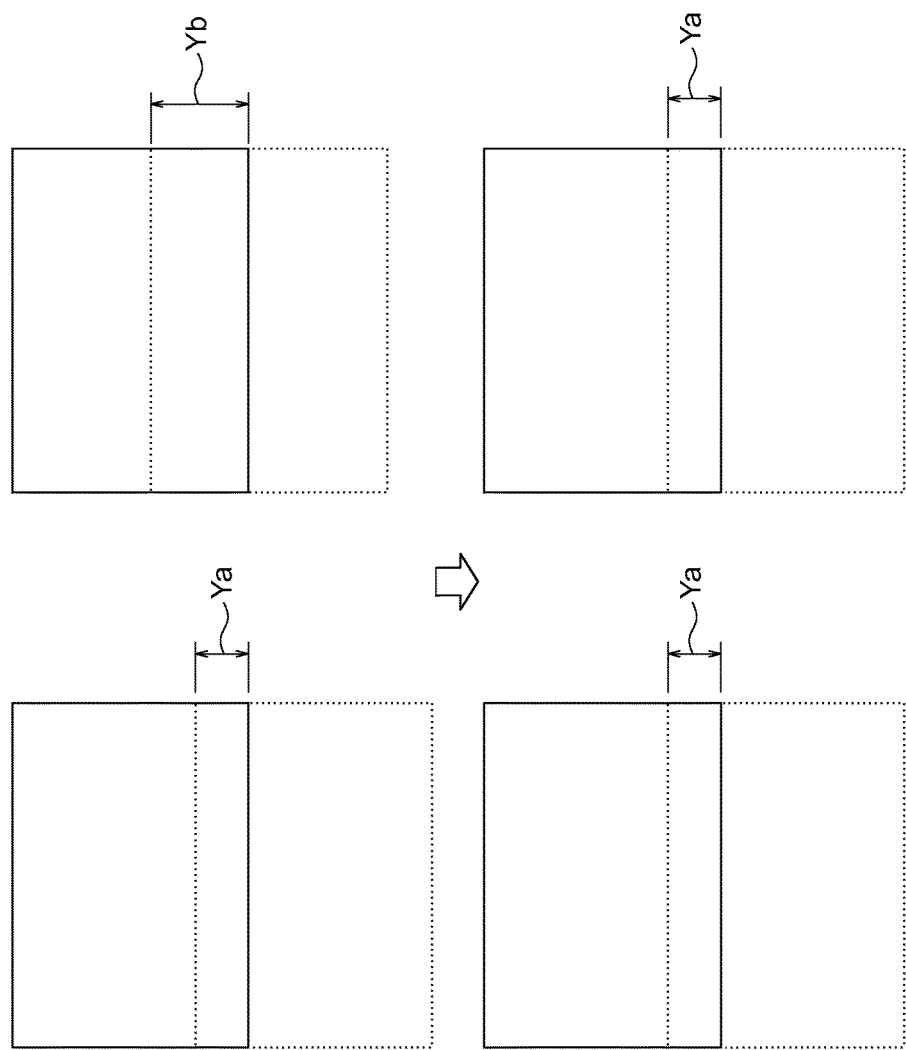
FIG. 22 is an explanatory diagram illustrating an example of a case in which plural regions are stitched together to create a single image.

FIG. 22 illustrates an example of a case in which images are stitched together for top and bottom images, and for left and right images. The example illustrated in FIG. 22 is a case in which respective regions at the top and bottom, and left and right, are stitched together two at a time. For example, when the vertical scroll bar region 140 and the horizontal scroll bar region 142 are present in the screen (see FIG. 17), there is sometimes a blank region present in the screen, and the size of an overlapping region in a specific column (row) is different from the overlapping region in another separate column (row). In such cases, as illustrated in FIG. 22, influence, such as from the blank, can be suppressed by aligning with the smallest length of overlapping region.

The overlapping pixel number derived by the image stitching processing is preferably temporarily recorded to enable it to be employed in subsequently described processing (for example, the processing of step 332). The search for the stitching portion may be executed in parallel to the image acquisition processing. When it has not been possible to find an overlapping region in the stitching portion search, it is possible to increase the number of regions for connecting together in a stitched image by re-performing acquisition of images at slightly moved locations (screen shot re-capture).

The CPU 42 then, at step 314, searches for, and lists up, data representing a character string or an image specified in the current row of the test scenario 81, from a stitched image acquired at step 306, or from a stitched image of the entire scroll region stitched at step 312. Namely, at step 314, the character string specified in the current row of the test scenario 81 is extracted by performing character recognition processing using OCR, and all of the coordinates of character strings found by character recognition are listed up. At step 314, an image specified in the current row of the test scenario 81 is extracted by image matching processing, and all of the coordinates of extracted images are listed up. A degree of freedom may be applied to the character string, so as to pick up front portion matches, rear portion matches, and partial matches. The character strings or images listed up at step 314 are candidates for the target object.

Then, at step 315, the CPU 42 lists up data representing character strings described in marker data, or lists up data representing character strings described in positional relationship data during comparison determination. When an image has been specified by marker data, a search is made for the specified image, for example using OCR. The character strings or images listed up at step 315 are candidates for the peripheral object. The processing at step 314 and step 315 may be implemented by the CPU 42 executing the OCR specified character string search process 72 with search processing by OCR using a function for complete match search processing of images, or for fuzzy match search processing, and using the image search process 70.

Then, at step 316, the CPU 42 determines whether or not a candidate for the target object has been discovered. The determination processing of step 316 may be determination by the CPU 42 determining whether or not a character string or image has been listed up by the processing of steps 314 and 315. When it has not been possible to list up a character string or image, the CPU 42 makes negative determination at step 316, and, at step 318, determines that GUI installation is unsuitable, including the possibility that there is a problem with the installation of the GUI. However, when it has been possible to list up a character string or image, the CPU 42 makes affirmative determination at step 316, and transitions processing to step 320.

Then, at step 320, the CPU 42 determines whether or not it is possible to uniquely identify a candidate for a target object. In the determination processing of step 320, a condition representing the positional relationship recorded in the test scenario 81 is appended to the candidates for the target object (step 314) and the peripheral object candidate (step 315), and processing is implemented to reduce the number of candidates that fit for the target object. When there is a candidate for the target object that fits the condition, the CPU 42 makes affirmative determination at step 320, and transitions processing to step 324. However, when there is no candidate for the target object that fits the conditions present, the CPU 42 makes a negative determination at step 320, and, at step 322, performs processing to notify the user with data representing that there is a high possibility of there being a problem in the test scenario 81, and then ends the current processing routine.

The condition applied to the objects may be a condition for comparison determination in place of conditions representing positional relationships. It is difficult to generate the test scenario 81 by appending only conditions for comparison determination by executing the manipulation recording program 60. In order to execute more precise testing using the test scenario 81, a check point or the like may be added to the test scenario 81 manually by the user, and then automatic operation may be executed.

The CPU 42 may detect the positional relationship between objects by executing the position relationship detection process 74. For example, determination may be performed as to whether or not there is a fit to a condition by employing coordinate values in a rectangular coordinate system related to the positional relationship as input, employing the results of a specific computation equation as output, and then determining whether or not the output values are a predetermined threshold value or lower. The data representing conditions appended to the objects may be embedded in program code, or recorded as condition data, such as in a database in an external recording device, and then read in.

When no degrees of freedom are given when listing up candidates for the target object at step 314, there is a high possibility that a single character string is the target object when there is only a single character string of candidates for the target object in the stitched image. Giving a degree of freedom refers to imparting a condition, such as having a front match, having a rear match, or having a partial match, to the character string. However, when there is not only a single character string of candidates for the target object present in the stitched image, the plural character strings are then reduced by using the conditions. The condition may be a combination of plural conditions, but preferably, reduction is eventually made to a single condition. In cases in which there is no reduction to a single candidate (such as when plural individual candidates remain, or when there are no candidates meeting the condition), preferably, at step 322, information such as a warning is notified to the user, the present routine is ended, and the test scenario 81 is manually changed by the user.

However, in cases in which candidates for the target object are listed up at step 314, and a search is performed while imparting a degree of freedom to the character string, such as having a front match, having a rear match, or having a partial match, it is difficult to uniquely identify a candidate as the target object. In cases in which it is difficult to uniquely identify a candidate as the target object, the processing of following step 324 onwards may be implemented for each of all of the listed up candidates for the target object.

The CPU 42 then, at step 324, determines whether or not a target object of the operation target recorded in the test scenario 81, namely a target object that is the operation target for the mouse 46M, matches the candidate of the target object identified at step 320. The CPU 42 makes negative determination at step 324 when, for example, a target object of an operation target is a pre-recorded icon or the like, and, at step 326, all images are listed up of search results (images such as icons) from image searching for the target object of the operation target. The CPU 42 then, at step 326, determines whether or not it has been possible to find a candidate for the target object, and when negative determination is made, determines at step 318 that the GUI is unsuitable, and ends the current processing routine. However, when the CPU 42 makes affirmative determination at step 328, the CPU 42 transitions processing to step 330. At step 330, the CPU 42 uniquely identifies the candidates for the target object, and then transitions processing to step 332.

In the processing of steps 324 to 330, when the target object of the operation target is a pre-recorded icon, the CPU 42 lists up the candidates for the target object by executing the image search process 70 with a complete match search function, and a fuzzy search function employing a threshold value. When the target object of the operation target is a character string input region, the CPU 42 lists up a rectangular region by executing the rectangular region search process 78, since the length, height, and the like thereof are variable. The listing up of the rectangular region may be performed by detecting straight lines, such as by using known technology of a Hough transform, and then, after constricting the straight lines to vertical and horizontal straight lines, a method is employed, such as determining a rectangular region based on the shape of a closed region.

The CPU 42 then, at step 332, executes an emulation of actual operation (detailed explanation follows) by executing the event emulation process 75. Then, the CPU 42 determines whether or not the test scenario 81 has progressed to the final row, affirmative determination is made at step 334 when the test scenario 81 is at the final row, and operation is ended with determination at step 336 that the there is no problem with installation of the GUI, and that the installation of the GUI is suitable. However, when the final row has not yet been reached in the test scenario 81, the CPU 42 makes negative determination at step 334, and returns to the processing of step 300.

Note that the CPU 42, at step 330, appends a priority ranking to the positional relationship to all the character strings and images found, and executes processing to reduce the target objects to those with high priority ranking.

Explanation next follows regarding definition of the priority ranking consideration at step 330. For a character string, the likelihoods of locations for placement of an object differ depending on the type of object. The priority ranking is therefore defined by classification for each of the types of object. Explanation next follows regarding an example of definition of a priority ranking classified and defined for each of the types of object, in a first definition to a third definition.

Explanation follows regarding a priority ranking definition of check boxes (FIG. 7) as the first definition. For check boxes, since there is often an image of a check box present at the left side of a character string, images with the shortest separation distance at the left side of a character string are prioritized. Examples of a definition "at the left side", and a definition of "separation distance" are explained in the following examples of condition definitions. When there is not even one image "at the left side", a search is similarly made for candidates in images "at the right side". Searching may also continue in sequence for images "at the bottom side", and images "at the top side". When there is not even a single image that matches the defined conditions, a search is then made from the whole image for an image that is the nearest separation distance away. An example of a definition of separation distance when searching from the whole image is explained in the following examples of condition definitions.

Explanation follows regarding a priority ranking definition of textboxes (FIG. 10) as the second definition. For textboxes, since there is often an image present at the right side of a character string, images with the shortest separation distance to the right side of a character string are prioritized. Examples of a definition "at the right side", and a definition of "separation distance" are similar to those for check boxes, and search continues in sequence for images "at the right side", "at the bottom side", "at the top side", "at the left side", and "in the whole image".

Explanation follows regarding priority ranking definition of other objects as the third definition. Other objects are defined similarly to in the first definition and the second definition. For example, a radio button (FIG. 11) is defined by similar conditions to those of a check box. The more types of object defined, the more versatile the operations are that can be executed automatically. The first definition to the third definition are called and used by the position relationship detection process 74 when the CPU 42 is executing the position relationship detection process 74.

The first definition to the third definition have been explained as examples of definitions of priority ranking, but there is no limitation to the first definition to the third definition.

Explanation next follows regarding an example of condition definition. The condition definition example is an example of a coordinate condition definition. The condition definition example contains, for example, a relationship definition and a separation distance definition. The relationship definition contains, for example, a determination by direction, a determination as a table, a mesh coordinate determination, and another determination. Explanation of each follows.

Figure 23:
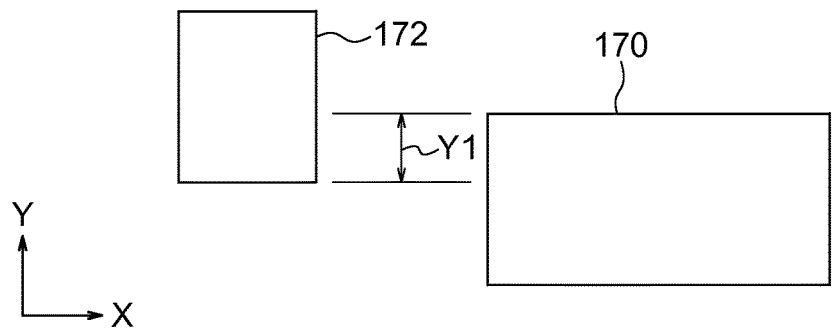
FIG. 23 is an explanatory diagram illustrating an example of determination by direction in a relationship definition.
Figure 24:
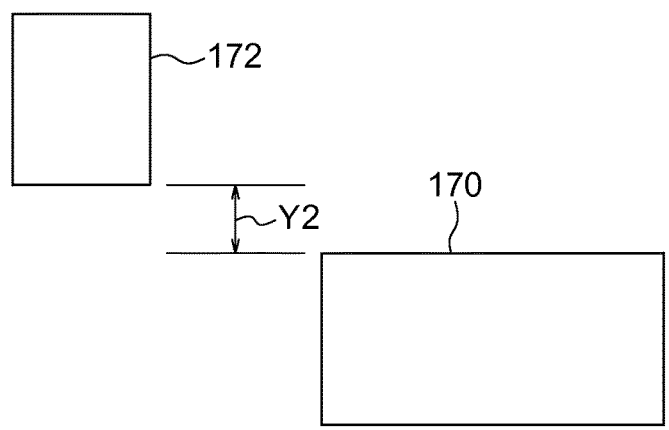
FIG. 24 is an explanatory diagram illustrating an example of determination by direction in a relationship definition.

FIG. 23 and FIG. 24 illustrate examples of determination by direction in a relationship definition. FIG. 23 illustrates an example in which y coordinates overlap, and FIG. 24 illustrates an example in which there is no overlap. In the determination examples by direction in the relationship definitions illustrated in FIG. 23 and FIG. 24, a character string, such as "at the left side", is defined as the relationship definition. An example of a definition of "at the left side" is a condition that the x coordinate of the left end of the character string is the same as or larger than the x coordinate of the right end of the image (icon), and at least a number of dots slightly overlap in the y coordinates thereof. In FIG. 23, a second object 172 of the determination target is illustrated with y coordinates overlapping for a distance Y1 "at the left side" of a first object 170 subject to determination. In FIG. 24, a second object 172 is illustrated separated by a y coordinate separation distance of separation distance Y2 "at the left side" of the first object 170 subject to determination.

Figure 25:
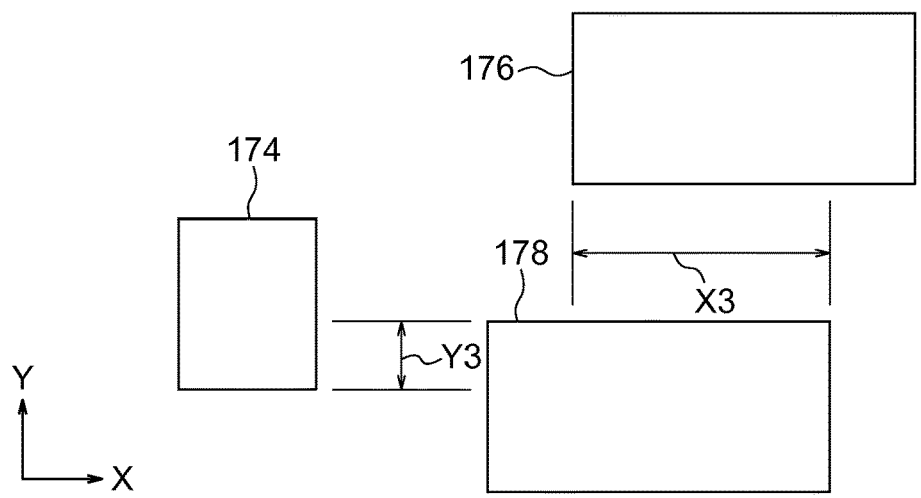
FIG. 25 is an explanatory diagram illustrating an example of determination as a table in relationship definition.

FIG. 25 illustrates an example of determination as a table in relationship definition. In FIG. 25, the since an overlap is established in both the x coordinates and the y coordinates, the positional relationship is defined as matching. In FIG. 25, a third object 178 of a determination target overlaps by a y coordinate distance Y3 "at the right side" of a first object 174 that is a row label element, and overlaps by a x coordinate distance X3 "at the bottom side" of a second object 176 that is a column label element.

Figure 26:
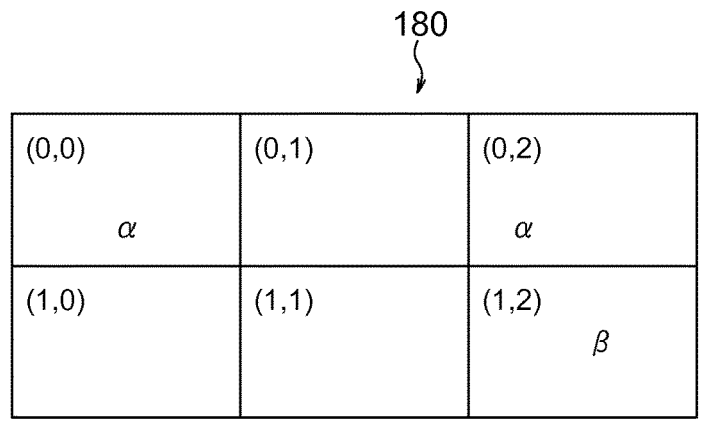
FIG. 26 is an explanatory diagram illustrating an example of a mesh coordinate determination in relationship definition.

FIG. 26 illustrates an example of a mesh coordinate determination in relationship definition. FIG. 26 illustrates a case in which a GUI window is divided into 3 in the x direction, and divided into two in the y direction. The position of each of the divided windows divided from the GUI window is expressed in the format (row, column). For example, if the determination target element "α" is present in the divided window (0, 0) then this indicates that the condition is established. Namely, it is indicated that:

for the determination target element α, the condition (0, 0) is established;
for the determination target element α, the condition (1, 2) is not established;
for the determination target element β, the condition (1, 2) is established; and
for the determination target element β, the condition (0, 2) is not established.

An example of other determinations in relationship definitions is to compute the occupied surface area of a candidate character string, and to determine "relationship established" for the largest candidate character string for an object subject to determination. It should be noted that only the candidate character string that is furthest up, or the furthest to the left, may be appended with the condition "relationship established".

Figure 27:
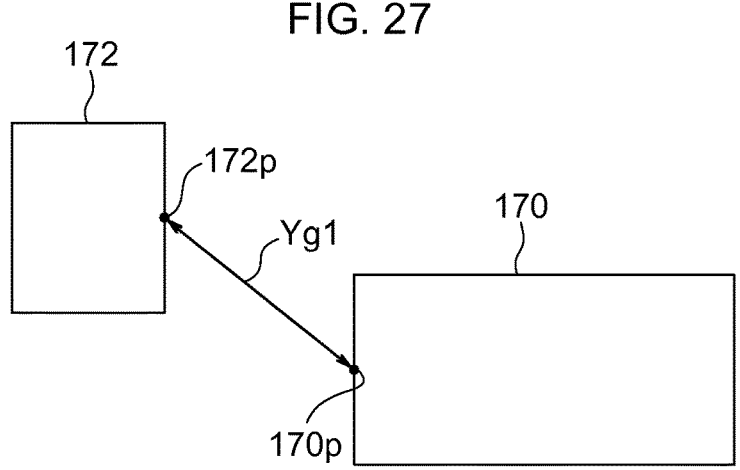
FIG. 27 is an explanatory diagram illustrating an example of separation distance definition.
Figure 28:
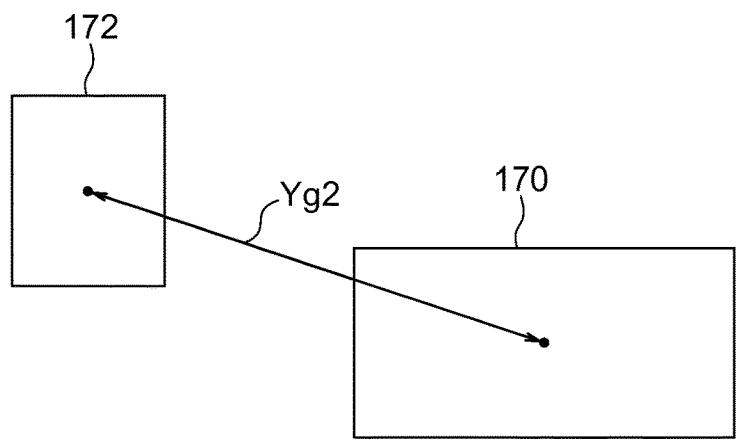
FIG. 28 is an explanatory diagram illustrating an example of separation distance definition.

FIG. 27 and FIG. 28 illustrate examples of separation distance definitions. FIG. 27 illustrates an example of a definition of "separation distance" for a case in which the target object is "at the left side" in a relationship definition by direction. The coordinates of point 170P are defined as the x coordinate of the left edge of the first object 170, and the central point between the top edge and the bottom edge y coordinates of the first object 170. The coordinates of point 172P are defined as the x coordinate of the right edge of the second object 172 subject to determination, and the central point between the y coordinates of the top edge and the bottom edge of the second object 172. A case is illustrated in which the Euclidean separation distance Yg1 is then determined between the point 170P and the point 172P. FIG. 28 illustrates a procedure for reducing the target object candidates with the processing of step 315 illustrated in FIG. 16, in a case in which there is no candidate satisfying a predetermined relationship definition, and illustrates a case in which the Euclidean separation distance Yg2 between each center point is taken as a definition by separation distance for a search of all the listed up objects.

Figure 16:
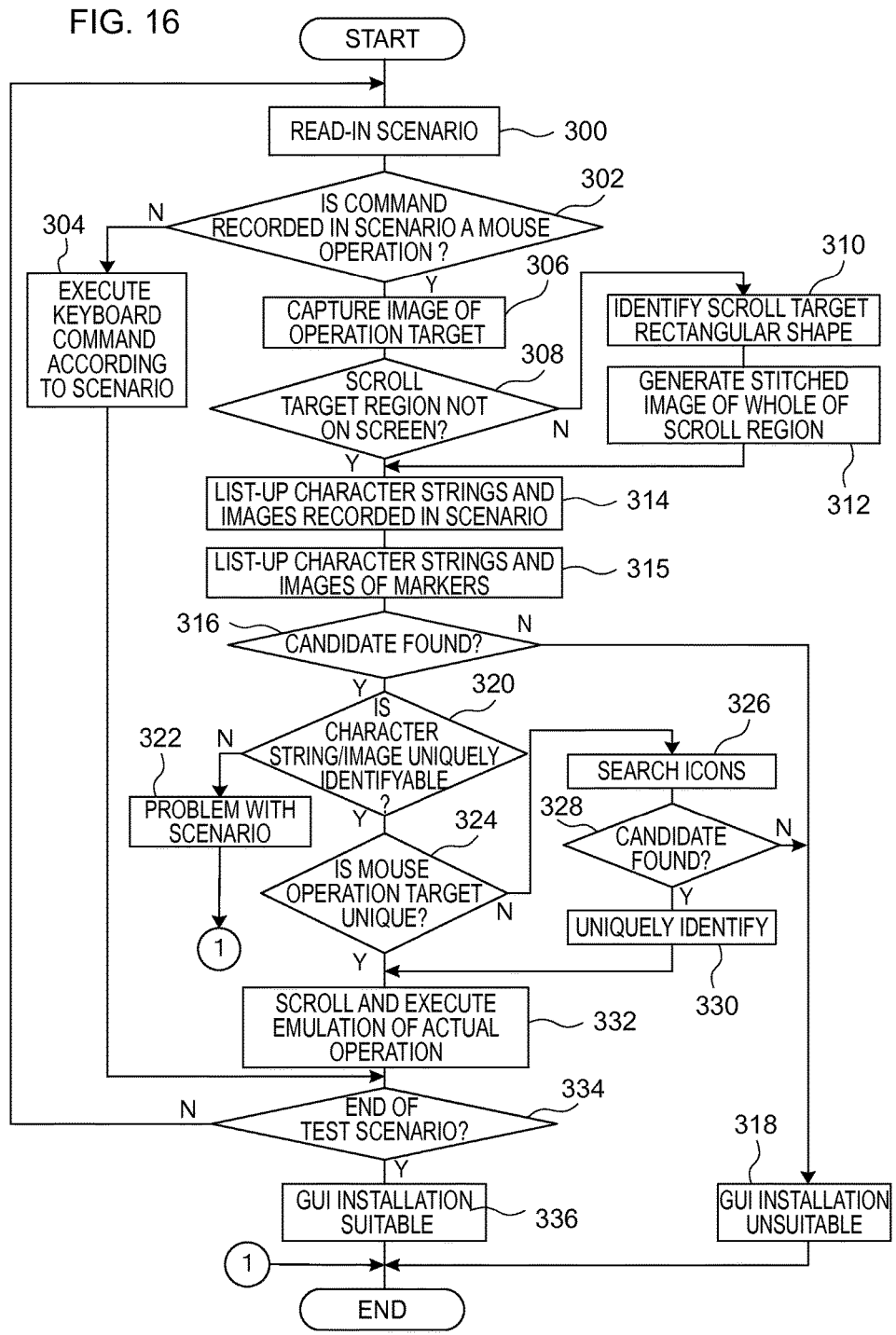
FIG. 16 is a flow chart illustrating an example of flow of processing of an automatic operation program.
Figure 29:
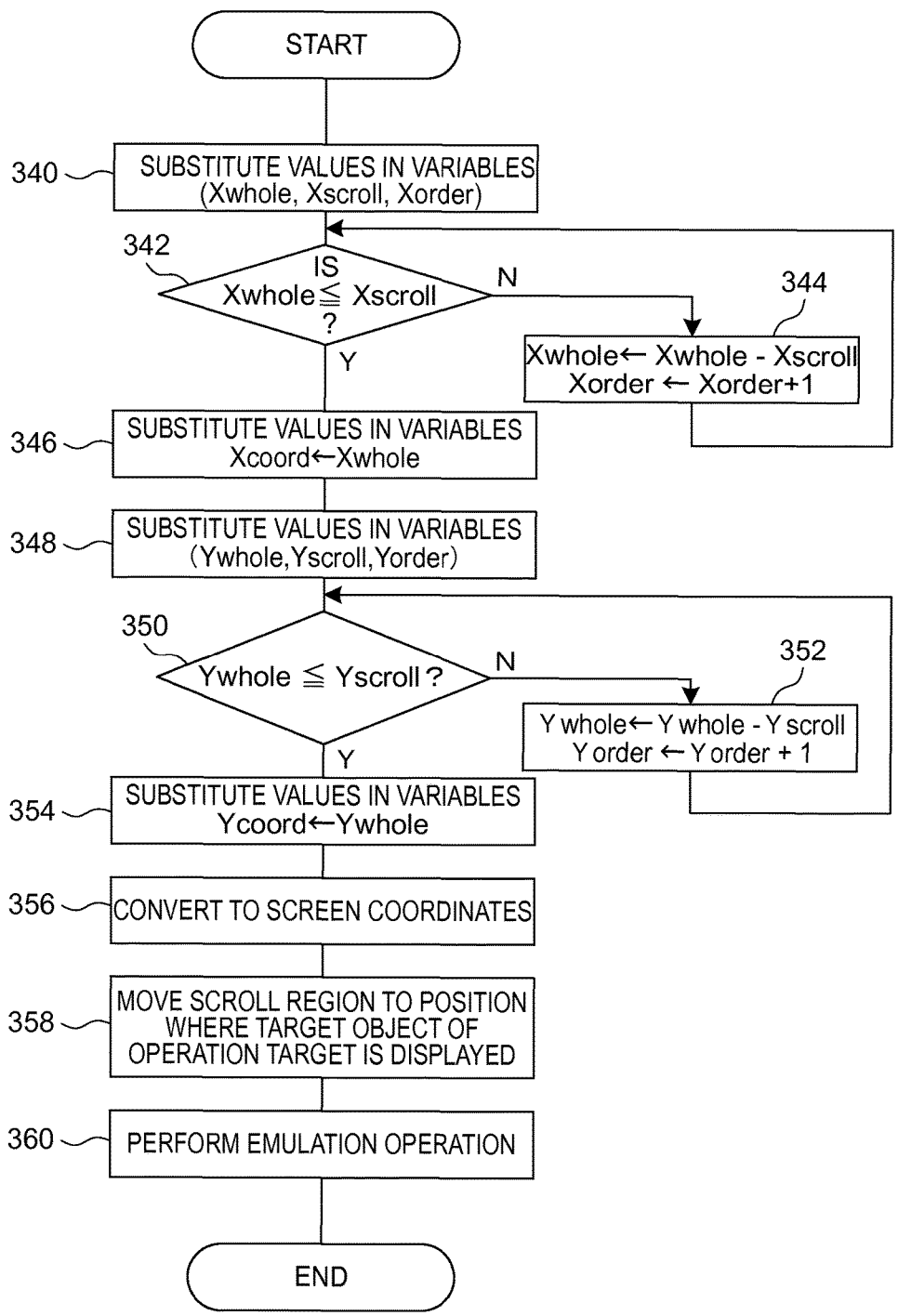
FIG. 29 is a flow chart illustrating an example of flow of emulation processing of operation.

Detailed explanation next follows regarding processing of step 332 illustrated in FIG. 16, with reference to FIG. 29. In the processing of step 332, a scroll region is moved (scrolled) so as to display a target object of an operation target, and emulation is executed of an actual operation on the target object in the scroll region. The CPU 42 achieves execution of the emulation of actual operation illustrated in FIG. 29 by executing the event emulation process 75.

First, the image width and image height of the scroll region is repeatedly subtracted from the image width and image height of the stitched image until the coordinates of the position where the target object is displayed is reached, and the number of times repeated is derived as the scroll number of times. The number of pixels of the overlap derived by the image stitching processing may also be subtracted (step 312).

More precisely, the CPU 42 substitutes values for variables (Xwhole, Xscroll, Xorder) at step 340 of FIG. 29. The image width in the stitched image up to the coordinates of the position where the target object is displayed is substituted in the variable Xwhole. The image width of the scroll region is substituted in the variable Xscroll. The number of times of repeat calculation which is the scroll number of times on the image in the X axis direction (initial value "0") is substituted in the variable Xorder. Then the CPU 42 repeats processing (step 344) that subtracts the variable Xscroll from the variable Xwhole until the value of variable Xwhole is a value of variable Xscroll or lower (affirmative determination at step 342), to derive the scroll number of times in the X axis direction (the value of the variable Xorder). The final value of the variable Xwhole in the subtraction processing corresponds to the X coordinate where the target object is displayed in the scroll region, and so is substituted into a variable Xcoord (step 346).

Then, at step 348, the CPU 42 substitutes values into variables (Ywhole, Yscroll, Yorder). The image height in the stitched image up to the coordinates of the position where the target object is displayed is substituted in the variable Ywhole. The image height of the scroll region is substituted in the variable Yscroll. The number of times of repeat calculation which is the scroll number of times on the image in the Y axis direction (initial value "0") is substituted in the variable Yorder. Then the CPU 42 repeats processing (step 352) that subtracts the variable Yscroll from the variable Ywhole until the value of variable Ywhole is a value of variable Yscroll or lower (affirmative determination at step 350), to derive the scroll number of times in the Y axis direction (the value of the variable Yorder). The final value of the variable Ywhole in the subtraction processing corresponds to the Y coordinate where the target object is displayed in the scroll region, and so is substituted into a variable Ycoord (step 354).

The CPU 42 then, at step 356, converts the coordinates of the target object from the coordinates of the stitched image to screen coordinates at which the image is actually being displayed. Namely, the variables Xcoord, Ycoord which are the final values of the variables Xwhole, Ywhole from the subtraction processing are the X coordinate and Y coordinate of the target object in the scroll region, with the top left corner of the scroll region as the origin. This thereby enables the actual operation screen coordinates to be derived by adding the variables Xcoord, Ycoord to the screen coordinates of the top left corner of the scroll region.

The CPU 42 then, at step 358, moves the scroll region to the position where the target object of an operation target is displayed. Namely, the CPU 42 performs processing similar to the processing of step 312 illustrated in FIG. 16, and derives the coordinates where mouse operation should occur, and then moves the scroll region to the position where the target object of an operation target is displayed by moving the scroll bar.

Then, at step 360, the CPU 42 performs an operation at the screen coordinate derived at step 356. For example, by executing the event emulation process 75, the CPU 42 performs an operation using an API or the like coupled to a screen event generation of the OS 56. Namely, the CPU 42 applies the screen coordinates derived at step 356 as parameters in the API, and executes operation at the screen coordinates.

The operation with respect to the target object of an operation target depends on the type of the target object of an operation target, such as a combination box (FIG. 19), a window menu, or the like, and in some cases a new screen region is generated. When a new screen region is generated in accordance with the type of the target object of an operation target, a screen shot is captured both before and after generation of the new screen region, and a difference region is derived. The CPU 42 may then execute step 306 to step 332 on the derived difference region. For example, in a scenario recorded as a continuation of plural events, application is possible in cases in which an operator has manually switched continuous events into a single row. In such cases, a function to process continuously based on a scenario of a single row is preferably installed in the automatic operation program 68.

FIG. 30 illustrates a window region 190 containing some of the objects in a window region 118 displayed on the screen of the display section 20 illustrated in FIG. 14, and a window region 196 containing objects with character sizes that have been changed in size after a scenario was generated. The test scenario 81 is recorded on the window region 190 displayed on the screen of the display section 20, and the application software 32 is executed on the window region 196 containing the size-modified character objects. When the operation target is a button, the character string data 106 corresponding to the button is stored in the test scenario 81, together with recording an image 120 containing direction 194 toward the operation target and the character string data 108 as a marker. The image 120 containing direction 192 toward the operation target is also recorded as another marker. When the size of characters has been modified after scenario generation, the display position of the button image 104 also moves. However, the operation target containing the operation position 130 for user operation with the mouse 46M can be identified as a button from the character string data 106, the image 120, the character string data 108, and the character string data 126 recorded in the test scenario 81. Namely, the operation target can be identified from the image 120, and from the direction 194 from the character string data 108 toward the operation target, and the direction 192 from the character string data 126 toward the operation target, recorded as markers in the test scenario 81. This thereby enables the operation target to be identified even though the application software 32 has a character size that has been modified after the test scenario 81 was generated, enabling user operation to be reproduced in accordance with the test scenario 81.

As explained above, the present exemplary embodiment detects the target object of the operation target and the user operation when GUI operation using application software is recorded in a scenario. Peripheral objects to the target object of the operation target, and the positional relationships on the screen of the peripheral objects to the target object are also detected. A scenario is generated that includes detected operation data including the user operation, the target object, the peripheral objects, and data representing the positional relationship between the target object and the peripheral objects, and the generated scenario is recorded in the test scenario 81. This thereby enables the target object and the user operation to be identified using the test scenario 81, from the data representing the target object and the user operation, the data representing the peripheral objects, and the data representing the positional relationship between the target object and the peripheral objects. Thus, when operation in application software is executed on a computer using the scenario, the position of the target object can still be identified even when, for example, the size of the characters has been made larger after the scenario was generated. This thereby enables the position of the target object to be identified even when, for example, part of the scenario has been modified, enabling the efficiency of work using scenarios to be improved.

In the present exemplary embodiment, image data representing objects may, for example, be stored in advance as an icon, enabling the target object to be easily identified by comparing an image region containing the operation position at the time of user operation against pre-recorded icons.

The present exemplary embodiment also employs character strings on images as objects, thereby enabling target objects to be easily identified. Executing image recognition processing, such as OCR, on an image acquired from a screen, enables a character string to be easily detected from a screen.

The present exemplary embodiment detects, and generates a scenario with, data representing directions from peripheral objects toward the target object as data representing positional relationships. The direction from a peripheral object toward the target object can thereby be identified from an image when an operation was executed by using the test scenario 81, enabling a target object to be readily identified.

The present exemplary embodiment enables plural peripheral objects to be associated with the target object. Data representing a priority ranking according to the separation distances between the target object and the peripheral objects is associated with the relationship between the target object and each of the plural peripheral objects. For example, data representing a priority ranking according to the separation distances between the target object and the peripheral objects is appended when plural peripheral objects are detected for a target object. This thereby enables the target object to be quickly identified in accordance with a priority ranking based on the separation distance relationships between the target object and the peripheral objects.

In place of the data representing the user operation, the data representing the target object and the peripheral object, and the data representing the positional relationship between the target object and the peripheral object detected using a computer, the present exemplary embodiment may acquire the data by reading-in data input by the input section 46. Namely, it is possible to generate a scenario by reading-in data input by the input section 46 as data representing the user operation, the target object, and the peripheral object, and as data representing the positional relationship between the target object and the peripheral object. Acquiring the data by reading in the data input by the input section 46 in this manner enables an increase in the degrees of freedom for data detection.

In the present exemplary embodiment, a scenario in which operation data is recorded is read in, then when the application software is executed, image data of the screen is acquired, the position of the target object is identified from the image data, and the user operation recorded in the scenario is executed. The target object can be identified before executing the user operation recorded in the scenario, enabling unsuitable operation states during scenario execution to be suppressed.

In the present exemplary embodiment, when a portion of an image region of the operation target is displayed on the screen by a window, plural image data is acquired so as to make a grid of image regions of the operation target, and stitched image data is generated representing a stitched image of the plural acquired image data stitched together. This thereby enables the position of the target object to be identified from the stitched image data that is the grid of image regions of the operation target, even when the target object is present outside of the window view and not in a visible state.

When identifying the position of the target object, the present exemplary embodiment is capable of determining that the read-in scenario is not suitable for execution on the application software when the position of the target object cannot be identified in the image of the user operable region. This thereby enables early discovery of an unsuitable operation state during scenario execution, based on the scenario determination result, without continuing with processing to identify the target object, enabling operation execution time during scenario execution to be suppressed from being extended in time.

Note that the processing of step 300 executed by the CPU 42 is an example corresponding to processing of a scenario read-in section in cases in which the computer 40 operates as the scenario execution device. The processing executed by the CPU 42 at steps 306 to 312 is an example corresponding to processing of an acquisition section in cases in which the computer 40 operates as the scenario execution device. Moreover, the processing executed by the CPU 42 at steps 314 to 330 is an example corresponding to processing of an identification section in cases in which the computer 40 operates as the scenario execution device. The processing executed by the CPU 42 at step 332 is an example corresponding to processing of an execution section in cases in which the computer 40 operates as the scenario execution device Second Exemplary Embodiment Explanation next follows regarding a second exemplary embodiment. In the first exemplary embodiment, an example has been explained of a case in which the scenario device 10 is implemented by the computer 40, and user operation with a GUI is tested by the computer 40 as a local machine. In the second exemplary embodiment, an example will be explained of a case in which operation of application software 32 executed on an external computer is tested with a GUI by the computer 40 as a local machine. The second exemplary embodiment is application of technology disclosed herein to a World Wide Web (WEB) application program as an example of the application software 32. The second exemplary embodiment is configured similarly to the first exemplary embodiment, and so the same reference numerals are appended to similar parts, and detailed explanation thereof is omitted.

Figure 31:
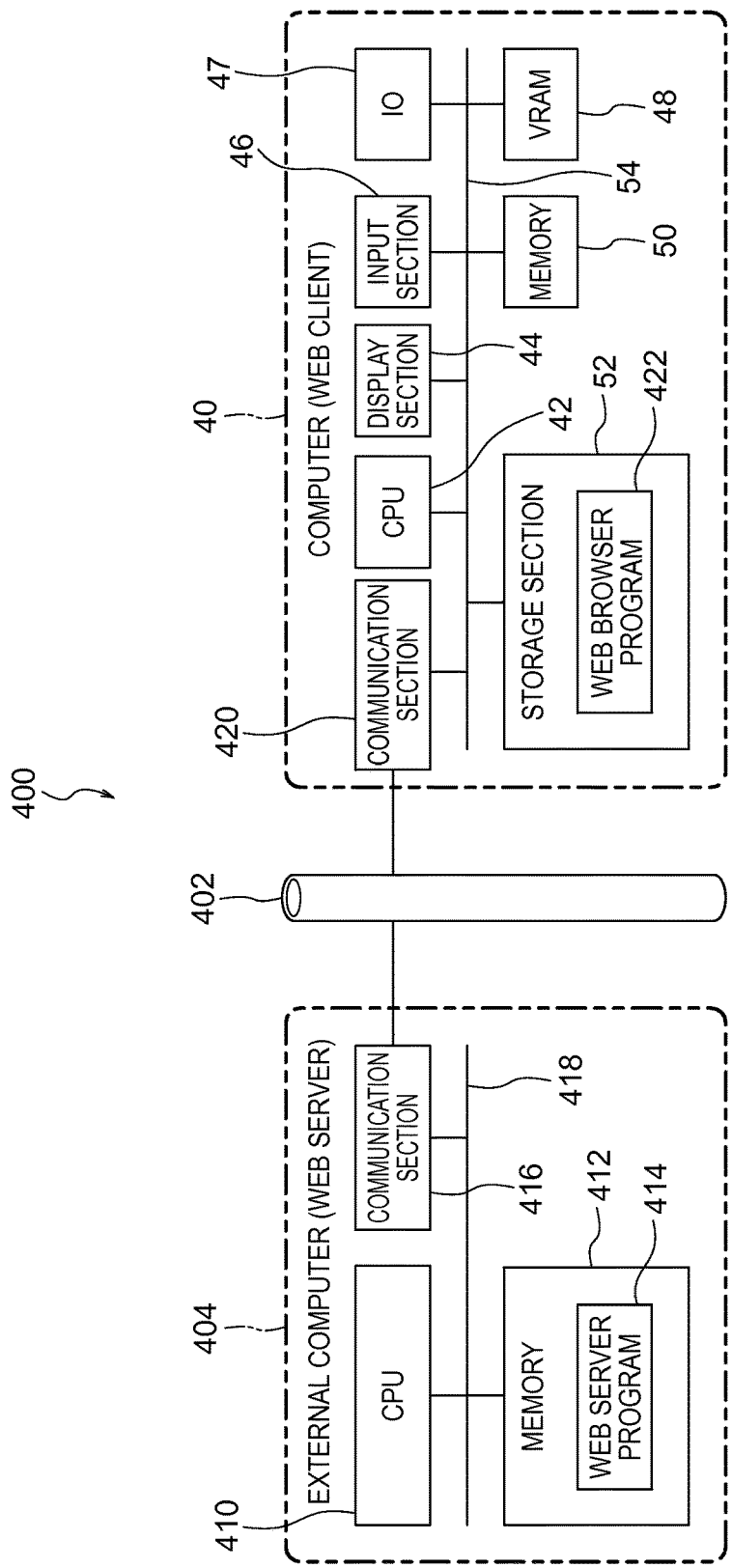
FIG. 31 is a block diagram illustrating an example of a scenario device implemented by a computer system according to a second exemplary embodiment.

FIG. 31 illustrates an example of the scenario device 10 implemented by a computer system 400 that includes an external computer 404 functioning as a WEB server, and the computer 40 functioning as a WEB client. The external computer 404 functioning as a WEB server includes a CPU 410, memory 412 stored with a WEB server program 414, and a communication section 416 that is an interface for connecting to a computer network 402. The CPU 410, the memory 412, and the communication section 416 are mutually connected together through a bus 418. The WEB server program 414 corresponds to the application software 32 using a GUI, and is the target for scenario generation and scenario execution.

The computer 40 functioning as a WEB client, similarly to in the first exemplary embodiment (FIG. 2), includes a CPU 42, a display section 44, an input section 46, an IO device 47, VRAM 48, a memory 50, and a storage section 52, with these being mutually connected together through a bus 54. In the present exemplary embodiment, the computer 40 is equipped with a communication section 420 that is an interface for connecting to the computer network 402. In the present exemplary embodiment, a WEB browser program 422 is also stored in the storage section 52 to exchange and display data from execution of the WEB server program 414.

In the present exemplary embodiment, a chain of operations is executed in the computer 40 by execution of the WEB browser program 422. The WEB browser program 422 displays a result of communication with the external computer 404 functioning as a WEB server, and the test target is the WEB server program 414 executed by the external computer 404. A window region of a WEB browser is displayed on the display section 44 of the computer 40 by executing the WEB browser program 422, and data is displayed by the WEB server program 414 in the window region of the WEB browser.

As explained above, the second exemplary embodiment enables operation of the application software 32 executed by an external computer to be tested with the GUI by the computer 40. This thereby enables a device for testing a scenario and the execution target program to be set externally to the computer 40. Thus, in addition to the advantageous effects of the first exemplary embodiment, the second exemplary embodiment also exhibits the advantageous effect of improving the degrees of freedom regarding the application location for the target device and for the execution target program.

Third Exemplary Embodiment

Explanation next follows regarding a third exemplary embodiment. In the third exemplary embodiment, explanation follows regarding an example in which operation of the application software 32 executed on an external computer is tested by a computer 40 having a remote desktop (RDT) function. The third exemplary embodiment is configured similarly to the first exemplary embodiment and the second exemplary embodiment, and so the same reference numerals are appended to similar parts, and detailed explanation thereof is omitted.

Figure 32:
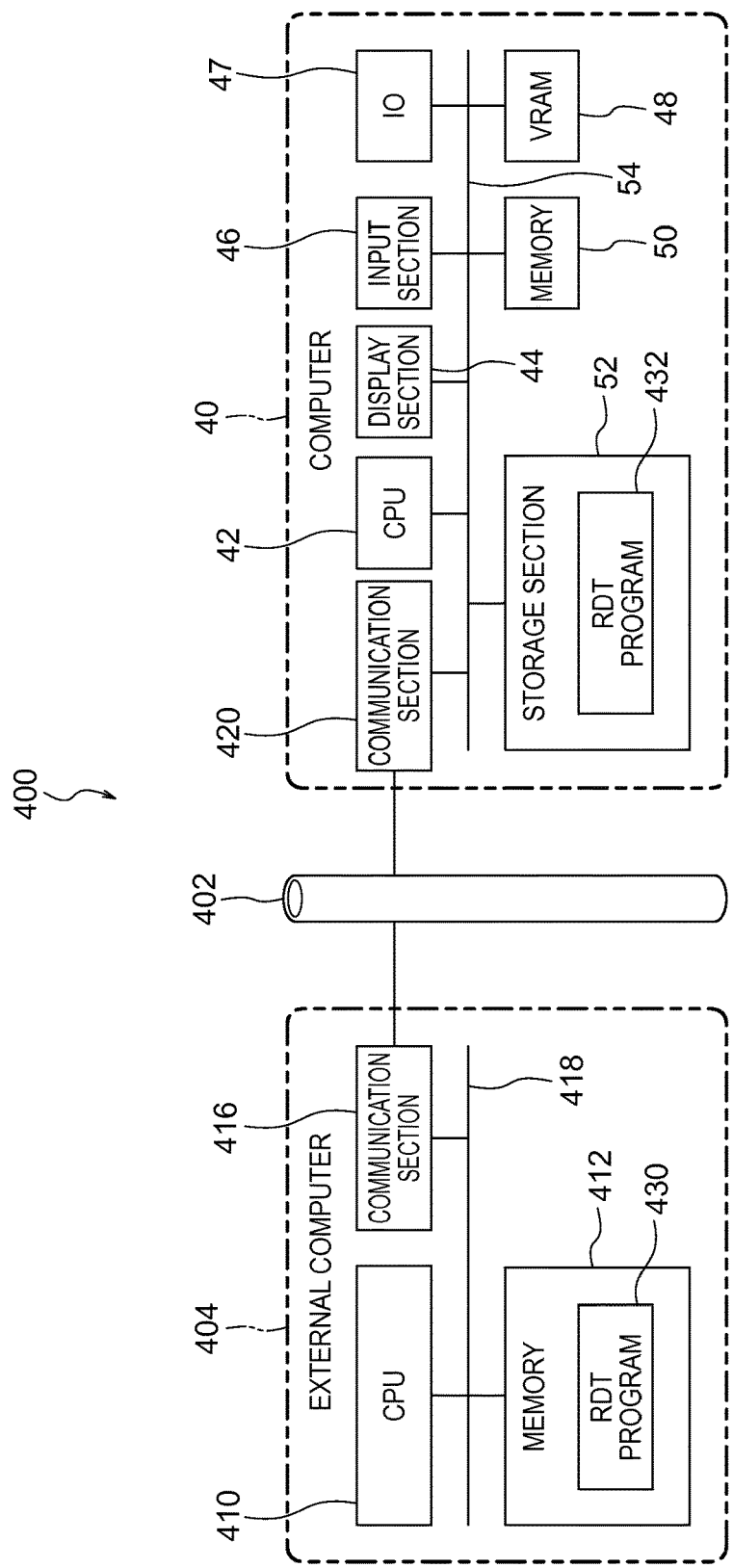
FIG. 32 is a block diagram illustrating an example of a scenario device implemented by a computer system according to a third exemplary embodiment.

FIG. 32 illustrates an example of a scenario device 10 implemented by an external computer 404 that is subject to remote operation by RDT function, and a computer system 400 including a computer 40. An RDT program 430 to enable remote operation by the computer 40 is stored in memory 412 of the external computer 404 that is subject to remote operation by RDT function. The application software 32 is executable on the external computer 404. An RDT program 432 with a remote operation target of the external computer 404 is stored in a storage section 52 of the computer 40.

In the present exemplary embodiment, the computer 40 employs the RDT function through the computer network 402, enabling the remote operation of the external computer 404. This thereby enables the application software 32 executed by the external computer 404 to be tested by an image displayed on the display section 44 of the computer 40.

Fourth Exemplary Embodiment

Explanation next follows regarding a fourth exemplary embodiment. In the fourth exemplary embodiment, an example will be explained of a case in which operation of application software 32 executed by an external computer is tested with a GUI by a computer 40 acting as a local machine. The fourth exemplary embodiment is a case in which the technology disclosed herein is applied to a mobile terminal as an example of an external computer 404. The fourth exemplary embodiment is configured similarly to the first exemplary embodiment through the third exemplary embodiment, and so the same reference numerals are appended to similar parts, and detailed explanation thereof is omitted.

Figure 33:
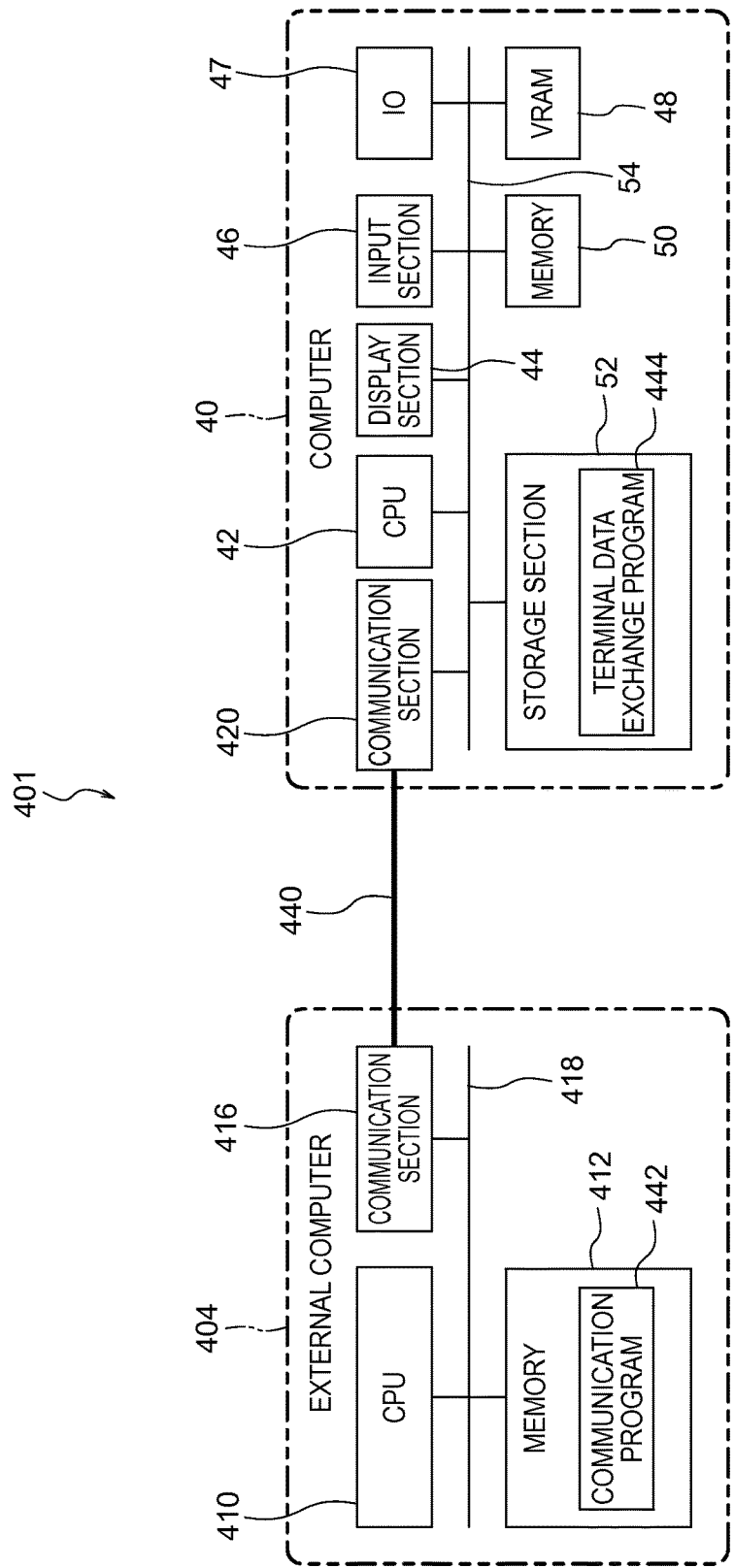
FIG. 33 is a block diagram illustrating an example of a scenario device implemented by a computer system according to a fourth exemplary embodiment.

FIG. 33 illustrates an example in which a scenario device 10 is implemented by the external computer 404 functioning as a mobile terminal, and a computer system 401 including the computer 40 that operates the external computer 404. The external computer 404 functioning as a mobile terminal and the computer 40 are USB-connected by a Universal Serial Bus (USB) cable 440. A communication program 442 to enable communication with the computer 40 is stored in memory 412 of the external computer 404 functioning as a mobile terminal. The application software 32 is executable on the external computer 404 functioning as a mobile terminal. A terminal data exchange program 444 to communicate with the external computer 404 is stored in the storage section 52 of the computer 40.

An Android terminal installed with a software execution environment called Android may be applied as an example of the external computer 404 functioning as a mobile terminal. In an Android terminal, software called Monkey-Runner is employed in the Android terminal to perform an Android Debug Bridge (adb) connection, enabling screen capture and terminal operation. MonkeyRunner is an example of an API for operating the Android terminal and an Android emulator from outside Android code.

In the present exemplary embodiment, a display image of the external computer 404 is acquired on the external computer 404 side, and processing is executed to instruct operation to the external computer 404 side. For example, processing to capture a screen is possible in a window region on the display section 44 of the computer 40. However, the processing load on the computer 40 side can be suppressed in comparison to processing to capture a screen on the display section 44 of the computer 40. Namely, in the external computer 404, processing is executed to directly acquire an image of a screen (screen capture image), and a screen operation API executes processing for direct transmission to the external computer 404 side.

As explained above, the fourth exemplary embodiment enables testing of operation of the application software 32 executed by the external computer 404 functioning as a mobile terminal using the computer 40 with a GUI. This thereby enables computer processing load to be reduced in cases in which the scenario testing is performed in the external computer 404 functioning as a mobile terminal.

Explanation has been given above of examples in which the scenario device 10 is implemented by the computer 40. However, there is no limitation to such a configuration, and various improvements and modifications may be implemented within a range not departing from the spirit as explained above.

Although explanation has been given above of a mode in which a program is pre-stored (installed) in a storage section, there is no limitation thereto. For example, the program of the technology disclosed herein may be provided in a form recorded on a recording medium, such as a CD-ROM or a DVD-ROM.

An aspect enables easy identification of the operation target at the time of scenario reproduction in cases in which operation on application software is executed by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

REFERENCE NUMERALS 10 scenario device
10a scenario generation device
10b scenario execution device
12 cpu
14 memory
18 input section
20 display section
22 operation recording section
24 automatic operation section
26 user interface application section
28 operation recording program
30 automatic operation program
32 application software
34 file
44 display section
46 input section
46k keyboard
46m mouse
49 recording medium 50 memory
52 storage section
58 GUI application program
60 operation recording program
68 automatic operation program
80 file
81 test scenario

What is claimed is:

1. A non-transitory computer-readable recording medium having stored thereon a program for causing a computer to execute by one or more processors, a scenario generation process, the process comprising:
   detecting a target object that is included in an image at an operation position of an operation target based on objects displayed as an image on a screen by application software operating on a computer and recording data representing the target object and data representing a user operation on the target object as an operation record;
   detecting, among the objects displayed on the screen, a peripheral object that is a character string or an image that is positioned around the target object and that becomes a mark to specify a position of the target object and recording data representing the peripheral object and data representing a direction in which the target object is searched among the peripheral object on the screen as the operation record;
   generating a scenario in which the data representing the user operation, the data representing the target object, the data representing the peripheral object, and data representing the direction in the operation record are associated with each other; and
   in a case in which the target object is a pre-recorded icon image, storing temporarily data representing a type and a state of the icon, searching a character string around an image of the icon and setting the searched character string as the target object, or
   in a case in which the target object is a non-recorded icon image, determining whether or not the target image includes a character string, in a case in which the target image includes the character string, storing temporarily data representing the character string and setting the character string as the target object and in a case in which the target image does not include the character string, storing temporarily an image that includes the target object and setting image as the target object.

2. The non-transitory computer-readable recording medium of claim 1, wherein in the scenario generation process:
   the detecting the target object includes identifying the target object based on a comparison result between an image of an identification region including an operation position at the time of user operation on the target object, and images of each of the objects pre-stored in a memory.

3. The non-transitory computer-readable recording medium of claim 1, wherein the scenario generation process further comprises:
   detecting positional relationships between the target object and a plurality of peripheral objects; and
   generating a scenario in which data representing a priority ranking in accordance with a separation distance between the target object and the peripheral object is associated with each of the plurality of detected peripheral objects.

4. The non-transitory computer-readable recording medium of claim 1, wherein the scenario generation process further comprises:
   acquiring the data representing the target object and the data representing the user operation on the target object by reading-in data input by an input section; and
   acquiring the data representing the peripheral object and the data representing the positional relationship on the screen between the target object and the peripheral object by reading-in data input by an input section.

5. The non-transitory computer-readable recording medium of claim 1,
   wherein the detecting the target object includes detecting the target object of the operation target searched according to a priority sequence of a predetermined direction and the user operation on the target object.

6. The non-transitory computer readable recording medium of claim 1, wherein
   detecting the peripheral object includes searching based on a priority sequence in a direction that is predefined in accordance with a type of the target object, prioritizing a peripheral object that is closest to the target object and detecting the prioritized peripheral object.

7. The non-transitory computer readable recording medium of claim 1, wherein
   the type of the icon includes at least one of a check box or a radio button.

8. The non-transitory computer readable recording medium of claim 1, wherein
   the data representing the target object includes a type data representing a type of a target object, data representing a clicked operation in a case in which being clicked, and a state data representing on state or off state.

9. A scenario generation method comprising:
   detecting a target object that is included in an image at an operation position of an operation target based on objects displayed as an image on a screen by application software operating on a computer and recording data representing the target object and data representing a user operation on the target object as an operation record;
   detecting, among the objects displayed on the screen, a peripheral object that is a character string or an image that is positioned around the target object and that becomes a mark to specify a position of the target object and recording data representing the peripheral object and data representing a direction in which the target object is searched among the peripheral object on the screen as the operation record;
   generating a scenario in which the data representing the user operation, the data representing the target object, the data representing the peripheral object, and data representing the direction in the operation record are associated with each other; and
   in a case in which the target object is a pre-recorded icon image, storing temporarily data representing a type and a state of the icon, searching a character string around an image of the icon and setting the searched character string as the target object, or
   in a case in which the target object is a non-recorded icon image, determining whether or not the target image includes a character string, in a case in which the target image includes the character string, storing temporarily data representing the character string and setting the character string as the target object and in a case in which the target image does not include the character string, storing temporarily an image that includes the target object and setting image as the target object.

10. The scenario generation method of claim 9, wherein detecting the peripheral object includes searching based on a priority sequence in a direction that is predefined in accordance with a type of the target object, prioritizing a peripheral object that is closest to the target object and detecting the prioritized peripheral object.

11. The scenario generation method of claim 9, wherein the type of the icon includes at least one of a check box or a radio button.

12. The scenario generation method of claim 9, wherein the data representing the target object includes a type data representing a type of a target object, data representing a clicked operation in a case in which being clicked, and a state data representing on state or off state.

13. A scenario generation device comprising:
a processor; and
a memory storing instructions, which when executed by the processor perform a procedure, the procedure including:
  detecting a target object that is included in an image at an operation position of an operation target based on objects displayed as an image on a screen by application software operating on a computer and recording data representing the target object and data representing a user operation on the target object as an operation record;
  detecting, among the objects displayed on the screen, a peripheral object that is a character string or an image that is positioned around the target object and that becomes a mark to specify a position of the target object and recording data representing the peripheral object and data representing a direction in which the target object is searched among the peripheral object on the screen as the operation record;
  generating a scenario in which the data representing the user operation, the data representing the target object, the data representing the peripheral object, and data representing the direction in the operation record are associated with each other; and in a case in which the target object is a pre-recorded icon image, storing temporarily data representing a type and a state of the icon, searching a character string around an image of the icon and setting the searched character string as the target object, or
  in a case in which the target object is a non-recorded icon image, determining whether or not the target image includes a character string, in a case in which the target image includes the character string, storing temporarily data representing the character string and setting the character string as the target object and in a case in which the target image does not include the character string, storing temporarily an image that includes the target object and setting image as the target object.

14. The scenario generation device of claim 13, wherein the procedure further includes:
  detecting the peripheral object includes searching based on a priority sequence in a direction that is predefined in accordance with a type of the target object, prioritizing a peripheral object that is closest to the target object and detecting the prioritized peripheral object.

15. The scenario generation device of claim 13, wherein the type of the icon includes at least one of a check box or a radio button.

16. The scenario generation device of claim 13, wherein the data representing the target object includes a type data representing a type of a target object, data representing a clicked operation in a case in which being clicked, and a state data representing on state or off state.

17. The scenario generation device of claim 13, wherein:
the data representing the positional relationship includes data representing a direction from the peripheral object toward the target object.

18. The scenario generation method of claim 9, wherein:
the data representing the positional relationship includes data representing a direction from the peripheral object toward the target object.

* * * * *